(12) United States Patent
Tadokoro et al.

(10) Patent No.: US 10,955,690 B2
(45) Date of Patent: Mar. 23, 2021

(54) SPECTACLE WEARING PARAMETER MEASUREMENT SYSTEM, MEASUREMENT PROGRAM, MEASUREMENT METHOD THEREOF, AND MANUFACTURING METHOD OF SPECTACLE LENS

(71) Applicant: HOYA LENS THAILAND LTD., Patumthani (TH)

(72) Inventors: Nobuyuki Tadokoro, Tokyo (JP); Naoya Hirono, Tokyo (JP); Masaaki Matsushima, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 224 days.

(21) Appl. No.: 15/547,953

(22) PCT Filed: Mar. 10, 2016

(86) PCT No.: PCT/JP2016/057608
§ 371 (c)(1),
(2) Date: Aug. 1, 2017

(87) PCT Pub. No.: WO2016/143861
PCT Pub. Date: Sep. 15, 2016

(65) Prior Publication Data
US 2018/0031868 A1 Feb. 1, 2018

(30) Foreign Application Priority Data

Mar. 10, 2015 (JP) .............................. JP2015-047759

(51) Int. Cl.
*G02C 13/00* (2006.01)
*G01B 11/02* (2006.01)
(Continued)

(52) U.S. Cl.
CPC ............ *G02C 13/005* (2013.01); *G01B 11/02* (2013.01); *G01B 11/14* (2013.01); *G02C 7/02* (2013.01);
(Continued)

(58) Field of Classification Search
CPC .... G02C 13/00; G02C 13/003; G02C 13/005; G02C 7/00; G02C 7/02; G02C 7/024;
(Continued)

(56) References Cited

U.S. PATENT DOCUMENTS 5,410,494 A 4/1995 Hashimoto et al.
6,257,721 B1 7/2001 Hayashi et al.
(Continued)

FOREIGN PATENT DOCUMENTS

EP 1 714 184 B1 11/2016
JP H06-018250 A 1/1994
(Continued)

OTHER PUBLICATIONS

Jul. 19, 2018 Extended Search Report issued in European Patent Application No. 16761827.1.
(Continued)

*Primary Examiner* — James C. Jones
(74) *Attorney, Agent, or Firm* — Oliff PLC

(57) ABSTRACT

To perform measurement in which a load on a subject is reduced. To provide a spectacle wearing parameter measurement system including: an information processing unit configured to associate a size of an appearance of at least a part of actual spectacles with a size of an appearance of at least a part of each of the spectacles in an imaging result of imaging a subject wearing the actual spectacles as an imaging target, and obtain a spectacle wearing parameter from the imaging result and the related art of the system.

19 Claims, 8 Drawing Sheets

(51) Int. Cl.
*G02C 7/02* (2006.01)
*G01B 11/14* (2006.01)
*G06F 3/0484* (2013.01)

(52) U.S. Cl.
CPC .......... *G02C 13/00* (2013.01); *G06F 3/04847* (2013.01)

(58) Field of Classification Search
CPC ........ G02C 7/027; G01B 11/00; G01B 11/02; G01B 11/14; G01B 7/30; G01B 11/26; G06F 3/00; G06F 3/01; G06F 3/048; G06F 3/0484; G06F 3/04847; G06F 17/50; G06F 19/00; A61B 3/0016; A61B 3/0025; A61B 3/0033; A61B 3/0041; A61B 3/11; A61B 3/111; A61B 3/145; B33Y 10/00; B33Y 50/00; B33Y 80/00; G06T 2201/00; G06T 2201/0601; G06T 7/00; G06T 7/0012; G06T 7/0014; G06T 7/60; G06T 2207/20172; G06T 2207/20192; G06T 2207/20212; G06T 2207/20221; G06T 2207/30; G06T 2207/30196; G06T 2207/30201; G06T 19/20
USPC .................. 351/178, 200, 204, 246; 345/173
See application file for complete search history.

(56) References Cited

U.S. PATENT DOCUMENTS

| | | | | |
|---|---|---|---|---|
| 6,692,127 B2* | 2/2004 | Abitbol | ................ | G02C 13/005 351/227 |
| 2005/0068495 A1 | 3/2005 | Jojiki | | |
| 2011/0242481 A1* | 10/2011 | Wada | ................... | G02C 13/005 |
| 2011/0258071 A1 | 10/2011 | Wada | | |
| 2014/0009737 A1 | 1/2014 | Kweon | | |
| 2016/0124249 A1 | 5/2016 | Haddadi et al. | | |

FOREIGN PATENT DOCUMENTS

| | | |
|---|---|---|
| JP | H08-043316 A | 2/1996 |
| JP | H09-145324 A | 6/1997 |
| JP | 2000241118 A | 9/2000 |
| JP | 2005103039 A | 4/2005 |
| JP | 2007-216049 A | 8/2007 |
| JP | 2009-174923 A | 8/2009 |
| JP | 2011227173 A | 11/2011 |
| JP | 5013930 B2 | 8/2012 |
| JP | 2012239566 A | 12/2012 |
| WO | 2014/195623 A1 | 12/2014 |

OTHER PUBLICATIONS

Sep. 12, 2017 International Preliminary Report on Patentability issued in International Patent Application No. PCT/JP2016/057608.
Jun. 7, 2016 Search Report issued in International Patent Application No. PCT/JP2016/057608.
Nov. 29, 2018 Office Action issued in Japanese Patent Application No. 2017-505400.
Aug. 6, 2019 Office Action issued in Chinese Patent Application No. 201680011170.7.
"Solution of Transform Formula between Image Pixel Distance and Space Distance;" Software Guide; vol. 8, No. 12; Dec. 8, 2009.
Feb. 3, 2020 Office Action issued in Chinese Patent Application No. 201680011170.7.
Anonymous, "Mobile Phone My Measurement Toolbox", (Jun. 15, 2013).

* cited by examiner

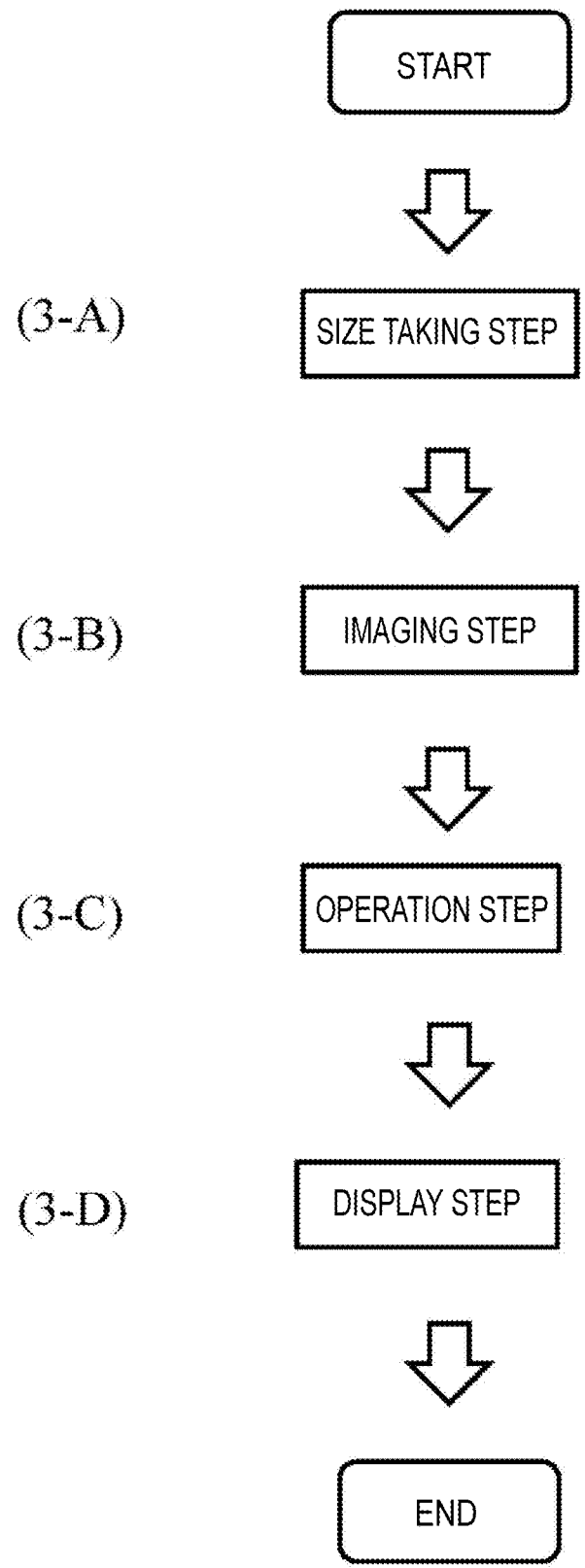

SPECTACLE WEARING PARAMETER MEASUREMENT SYSTEM, MEASUREMENT PROGRAM, MEASUREMENT METHOD THEREOF, AND MANUFACTURING METHOD OF SPECTACLE LENS

TECHNICAL FIELD

The present invention relates to a spectacle wearing parameter measurement system, a measurement program, a measurement method thereof, and a manufacturing method of a spectacle lens.

BACKGROUND ART

In general, the preparation of spectacle lenses requires spectacle wearing parameters that are measured in a state where a person wearing spectacles (hereinafter also referred to as a "subject") wearing a spectacle frame. Examples of the spectacle wearing parameters include a cornea vertex distance, a frame forward tilt angle, a fitting point position, a pupil distance, and a frame camber angle.

Among these examples, the measurement of a cornea vertex distance (Cornea Vertex Distance: also referred to as a CVD) is performed using, for example, a dedicated CVD measurement device. An example of the CVD measurement device is configured to position the face of a subject, pick up images of a side surface and a front surface of the face of the subject, and calculate the CVD based on the images obtained as the imaging result (e.g., see Patent Literature 1).

There is also a method for obtaining the CVD using scale aids by a relatively simple technique, instead of using a CVD measurement device. For example, a technique in which a measurement reference scale the like is formed on a spectacle frame is known.

For example, Patent Literature 2 discloses a technique for obtaining, as image data, an image of a side surface of the face of a subject wearing spectacles including a spectacle frame provided with scale aids with a scale of a predetermined size, calculating a corneal vertex of the subject whose image has been picked up, and calculating the CVD based on the scale aids.

CITATION LIST

Patent Literature

Patent Literature 1: JP 5013930 B2
Patent Literature 2: JP 2012-239566 A

SUMMARY OF INVENTION

Technical Problem

Among the techniques described above, the technique described in Patent Literature 1 can accurately measure the CVD. On the other hand, the size of the dedicated CVD measurement device itself is large. Specifically, the CVD measurement device has a structure in which a subject is seated and imaging means is freely movable around the subject. Thus, images of the side surface and front surface of the face of the subject are picked up. Accordingly, the size of the device itself is Large and the cost of the device not low. Therefore, it is not possible for all spectacles shops to purchase the device.

On the other hand, the technique disclosed in Patent Literature 2, it is only necessary to mount scale aids to a spectacle frame and pick up an image a subject wearing the spectacle frame. Therefore, it is possible to calculate the CVD with a relatively simple structure and at a low cost.

Although the technique disclosed in Patent Literature 2 may be inferior in accuracy to the technique disclosed in Patent Literature 1, the technique is useful in that the CVD can be obtained with a relatively simple structure and at a low cost. This structure makes it possible for many spectacles shops to obtain the CVD and reflect the CVD in spectacle lenses, and thus the performance of the spectacle lenses necessary when the subject wears spectacles can be derived.

However, as a result of studying the technique disclosed in Patent Literature 2, the present inventors have found the following problem.

When scale aids are mounted in a spectacle frame, it is highly likely that the scale aids may contact the face of the subject.

This may give a feeling of discomfort to the subject. Even if the scale aids do not come into contact with the face of the subject, the subject is made nervous.

Therefore, an object of the present invention is to provide a technique capable of performing a measurement while reducing a load on a subject.

Solution to Problem

A first aspect of the present invention is a spectacle wearing parameter measurement system including:
an information processing unit configured to associate a size of an appearance of at least a part of actual spectacles with a size of an appearance of at least a part of each of the spectacles in an imaging result of imaging a subject wearing the actual spectacles as an imaging target, and obtain a spectacle wearing parameter from the imaging result.

A second aspect of the present invention is an invention according to the first aspect, and the spectacles are sample spectacles comprising a spectacle frame in a state where no spectacle lenses are mounted in the spectacle frame, or sample spectacles having dummy lenses mounted in the spectacle frame.

A third aspect of the present invention is an invention according to the second aspect, and the information processing unit uses the imaging result to obtain a frame cornea vertex distance as a distance between a corneal vertex of the subject and each of the spectacles.

A fourth aspect of the present invention is an invention according to the third aspect, and the size of the appearance is a distance between a top end and a lower end of an outer periphery of a spectacle lens mounting part of each of the spectacles.

A fifth aspect of the present invention is an invention according to the fourth aspect, the spectacle wearing parameter measurement system further includes:
an imaging camera unit; and
a display screen unit configured to display the imaging result as an image,
the display screen unit functions as an imaging finder and a touch interface each capable of freely displaying, as an image, the imaging target and the imaging result, and the imaging result is displayed by a function of the imaging finer included in the display screen unit.

A sixth aspect of the present invention is an invention according to the fifth aspect, and the distance in the actual spectacles is obtained by taking the size of the actual spectacles placed on the display screen unit by a function of the touch interface included in the display screen unit.

A seventh aspect of the present invention is an invention according to the fifth or sixth aspect, and the association is calibration.

An eighth aspect of the present invention is an invention according to the seventh aspect, the spectacle wearing parameter measurement system further includes an operation unit configured to exercise a function of the touch interface included in the display screen unit and capable of freely specifying measurement reference points at an end in an upper direction of an outer periphery of each of the spectacles and an end in a lower direction of the outer periphery of each of the spectacles at a spectacle lens mounting p of each of the spectacles worn by the subject, in the imaging result of front viewed by the subject displayed on the display screen unit, and the information processing unit performs the calibration based on a distance between the measurement reference points specified by the operation unit.

A ninth aspect of the present invention is an invention according to any one of the first to eighth aspects, and the spectacle wearing parameter measurement system is a portable terminal device.

A tenth aspect of the present invention is a spectacle wearing parameter measurement program for causing a computer to function as an information processing unit configured to associate a size of an appearance of at least a part of actual spectacles with a size of an appearance of at least a part of the spectacles in an imaging result of imaging a subject wearing the actual spectacles as an imaging target, and obtain a spectacle wearing parameter from the imaging result.

An eleventh aspect of the present invention is a spectacle wearing parameter measurement method including:

an imaging step of imaging a subject wearing actual spectacles; and a measurement step of associating a size of an appearance of at least a part of the actual spectacles with a size of an appearance of at least a part of the spectacles in an imaging result, and obtaining a spectacle wearing parameter.

A twelfth aspect of the present invention is an invention according to the eleventh aspect, and the spectacle wearing parameter measurement method further includes a size taking step of taking, by a touch interface function included in a display screen unit configured to display, as an image, the imaging result obtained in the imaging step, a size of a distance between a top end and a lower end of an outer periphery of each of the spectacles at a spectacle lens mounting part of each of the actual spectacles placed on the display screen unit.

A thirteenth aspect of the present invention is an invention according to the eleventh or twelfth aspect, and in the measurement step, calibration is performed as the association based on a distance between measurement reference points by specifying the measurement reference points at an end in an upper direction of an outer periphery of each of the spectacles and an end in a lower direction of the outer periphery of each of the spectacles at the spectacle lens mounting part of each of the spectacles worn by the subject in the imaging result of front viewed by the subject displayed on the display screen unit, by using a touch interface function included in the display screen unit.

A fourteenth aspect of the present invention is a manufacturing method of a spectacle lens, including:

an imaging step of imaging a subject wearing actual spectacles;

a measurement step of associating a size of an appearance of at least a part of the actual spectacles with a size of an appearance of at least a part of the spectacles in an imaging result, and obtaining a spectacle wearing parameter from the imaging result; and a manufacturing step of manufacturing a spectacle lens based on the spectacle wearing parameter.

Advantageous Effects of Invention

According to the present invention, it is possible to perform a measurement while reducing a load on a subject.

BRIEF DESCRIPTION OF DRAWINGS

FIG. 1A illustrates an appearance perspective view; and FIG. 1B illustrates a functional block diagram.

FIG. 2A is a schematic perspective view illustrating a state where a spectacle frame is placed on the tablet terminal illustrated in FIG. 1A; FIG. 2B is a schematic plan view illustrating a state where the spectacle frame is placed on the tablet terminal; and FIG. 2C is a schematic plan view illustrating a result of taking the size of the spectacle frame placed on the tablet terminal.

FIG. 3 is a flowchart illustrating an outline of a procedure for a frame cornea vertex distance measurement method according to this embodiment.

DESCRIPTION OF EMBODIMENTS

First Embodiment

Figure 1A:
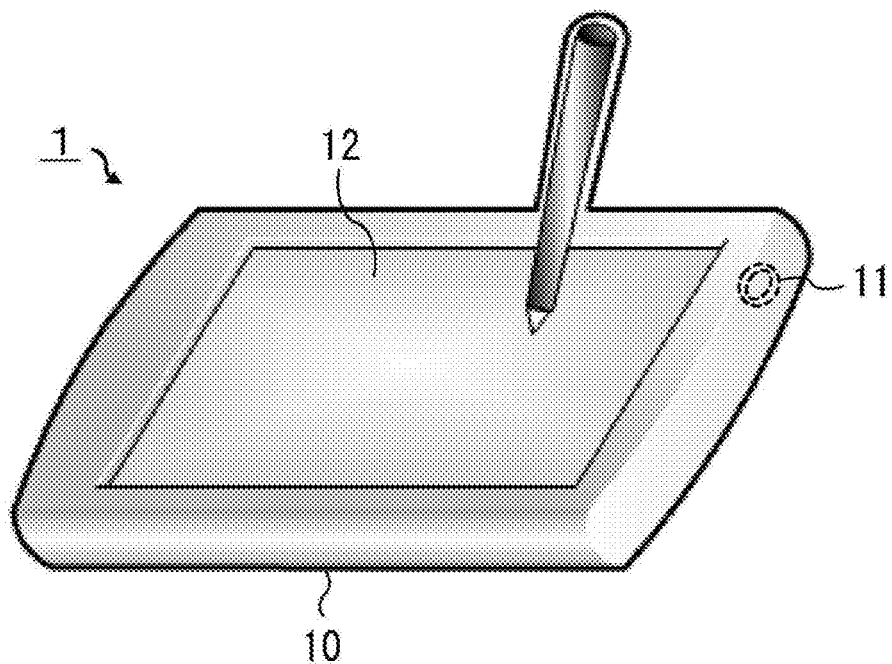
FIGS. 1A and 1B are explanatory views illustrating a frame cornea vertex distance measurement system according to this embodiment.

Embodiments of the present invention will be described below with reference to the drawings.

Descriptions are given regarding the following items.
1. Frame cornea vertex distance measurement system
1-A) Description of a frame cornea vertex distance
1-B) Outline of the frame cornea vertex distance measurement system
1-C) Description of each unit of the frame cornea vertex distance measurement system
2. Frame cornea vertex distance measurement program
3. Frame cornea vertex distance measurement method 3-A) Size taking step
3-B) Imaging step
3-C) Measurement step
3-D) Display step
4. Advantageous Effects of Embodiments
5. Modified Examples and the like Note that in this embodiment, a "frame cornea vertex distance" is used as an example of spectacle wearing parameters, and a system specialized in the frame corner vertex distance is illustrated. On the other hand, the technical idea of the present invention can also be applied when spectacle wearing parameters other than the frame cornea vertex distance are measured. This will be described later. Further, "vertical" in this embodiment indicates a vertical direction, and is hereinafter also referred to as "upper and lower". As described later, for example, an expression "a vertical width of an outer periphery of a spectacle frame" indicates a distance between a top end and a lower end of a spectacle frame (i.e., a vertical end width). An expression "a vertical width of a dummy lens" indicates a distance between a top end and a lower end of a dummy lens.

1. Frame Cornea Vertex Distance Measurement System

First, findings about the present invention will be described below. In addition to the possibility that scale aids may contact the face of a subject, the present inventors have obtained the following findings s a result of their study. As described above, the conventional preparation of spectacle lenses requires a CVD. As mentioned before, the conventionally used CVD or the cornea vertex distance indicates a distance between a corneal vertex of a subject and a vertex of an eyeball-side surface of a spectacle lens fitted into a spectacle frame, as disclosed in Patent Literature 2. Aside from the corneal vertex of the subject, the position of the vertex of the eyeball-side of the spectacle lens cannot be specified unless spectacle lenses are actually prepared, or virtual spectacle lenses are arranged on a simulation.

Further, the shape of the spectacle lens greatly varies depending on a prescription power. For example, if the prescription power is high, the thickness of the spectacle lens increases, so that the position of the vertex on the eyeball-side surface of the spectacle lens varies.

That is, from the conventional standpoint, it is extremely important for spectacle lenses to obtain the CVD and it is necessary to accurately measure the CVD. However, the present inventors have found that it is difficult to accurately measure the CVD.

After obtaining the findings as mentioned above, the present inventors have further studied. As a result, the present inventors have conceived of a technique for preparing a spectacle lens by using "an appearance (in particular, an appearance contour)" of each of spectacles, instead of directly measuring the CVD, based on a distance between a corneal vertex of a subject and a "spectacle frame" (the distance is referred to as a "frame cornea vertex distance", which is described in detail later). That is, the present invention has been conceived based on an idea that the spectacle lens preparation technique of the related art is reconstructed and the conventional need for using scale aids is eliminated.

Note that the present invention has been conceived after the present inventors have obtained findings about the following problem, in addition to the above-mentioned findings and the problems related to the findings.

As disclosed in Patent Literature 2, scale aids are mounted in a spectacle frame, a scar or a mounting mark (hereinafter "scar" mentioned as a typical example) is formed on the spectacle frame.

To reproduce a spectacle wearing state as faithfully as possible, the subject generally wears a spectacle frame to be purchased (a spectacle frame with no spectacle lenses), and is subjected to imaging. Accordingly, it is necessary to mount the scale aids in the spectacle frame to be purchased. In this case, if a scar is formed on the spectacle frame due to the mounting of the scale aids, the subject ends up purchasing the spectacles with spectacle lenses fitted into the scarred spectacle frame.

As a matter of course, the technique described in Patent Literature 2 is required to prepare scale aids exclusive for measurement of the CVD. If the scale aids are damaged, it is not possible to measure the CVD at a spectacles shop. In addition, the above-mentioned problem is caused due to the mounting of the scale aids, which are used to measure the CVD but are less frequently utilized, to the spectacle frame. In view of the above, the conventional preparation of the scale aids causes a disadvantage more than an advantage that it is possible to measure the CVD.

The present inventors have also found that the use of the scale aids causes a problem with the measurement accuracy as described below.

When the scale aids are mounted in a spectacle frame, the spectacle frame slips down due to the weight of the scale aids themselves, unlike in the normal wearing state. To obtain an excellent measurement accuracy, it is necessary to reproduce the spectacle wearing state as faithfully as possible. However, if the measurement is performed in a state where the spectacle frame slips down, it becomes difficult to accurately measure the CVD.

Further, when the scale aids are mounted in a spectacle frame as disclosed in Patent Literature 2, the scale aids are spaced apart from a measurement target (e.g., a corneal vertex), which may affect the measurement.

As a result of an earnest study made by the present inventors, the present invention has been made based on various perspectives as described above. An embodiment of the present invention will be described in detail below.

1-A) Description of a Frame Cornea Vertex Distance

Prior to giving a description of a specific structure of this embodiment, a "frame cornea vertex distance (which is also referred to as an FVD, but is hereinafter referred to as a frame cornea vertex distance)" will be described. The term "frame cornea vertex distance" described herein refers to a distance between a corneal vertex of a subject and a spectacle frame worn by a subject (an actual spectacle frame; the same applies hereinafter).

The term "actual" spectacle frame refers to the spectacle frame in a real space. This spectacle frame may be a spectacle frame in which the finally completed spectacle lenses are mounted, a sample frame of the same type as the spectacle frame, or a spectacle lens shape pattern in which dummy lenses are mounted, for example, in the case of a rimless spectacle frame.

Figure 4A:
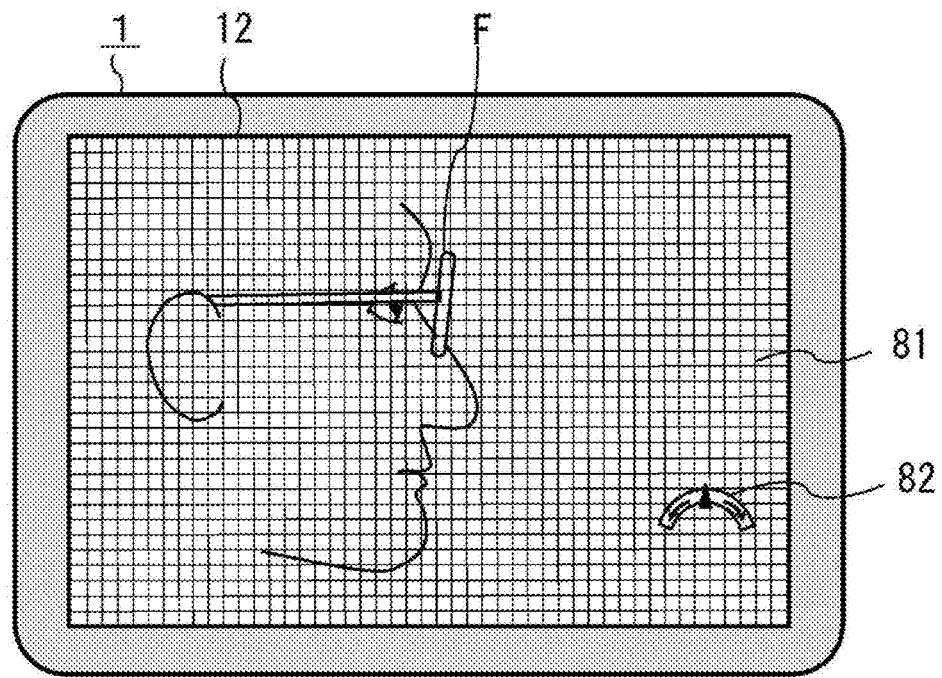
FIGS. 4A and 4B are explanatory views (No. 1) illustrating a specific example of a display content on a display screen unit when a frame cornea vertex distance is obtained in this embodiment.
Figure 4B:
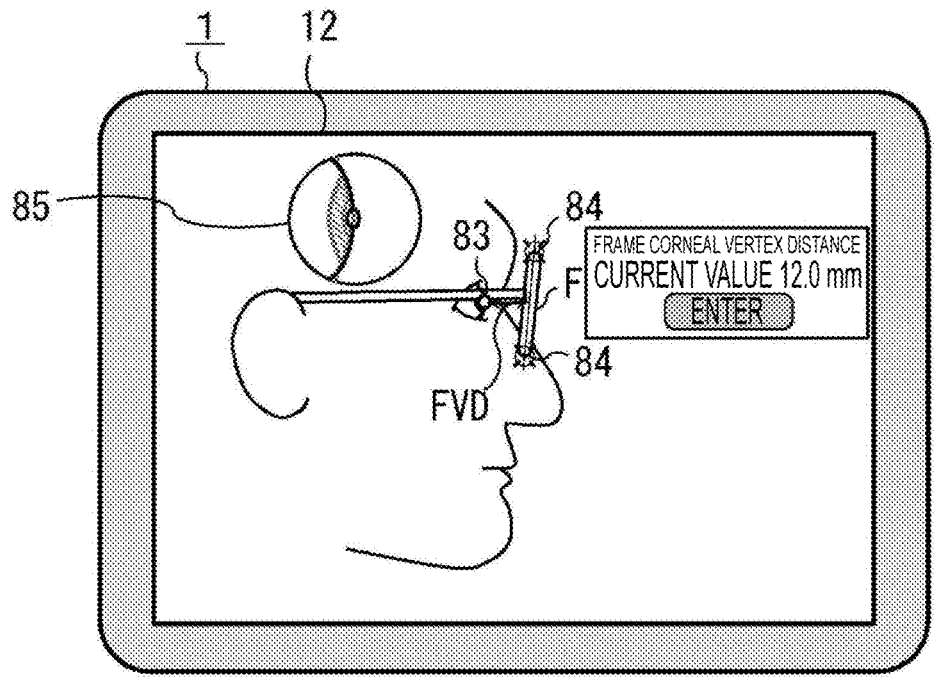
Figure 6:
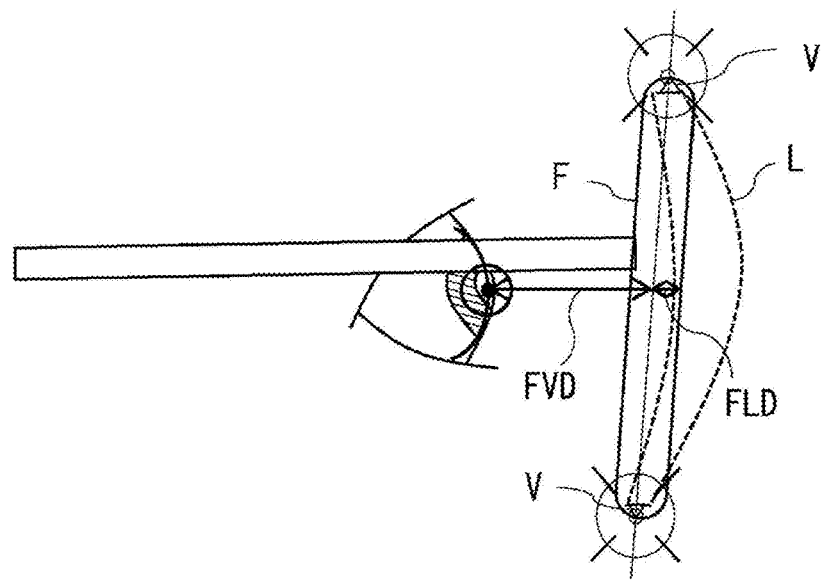
FIG. 6 is a schematic side view illustrating a state where a CVD is obtained from the frame cornea vertex distance in this embodiment.

FIG. 4B and FIG. 6 respectively illustrate the distance and the state where the distance is measured. A specific example of the frame cornea vertex distance is obtained as follows. That is, a measurer views a state where a subject is viewing a front side, or a state (distant viewing state) in which the lines of sight of the subject are directed in the horizontal direction (infinite distance) from a side surface of the subject, and when a line is extended from the corneal vertex of the subject to the spectacle frame worn by the subject in this state in the horizontal direction, a distance to an intersection between the line and a straight line connecting the center of the width of an upper rim located at an outer peripheral uppermost end of the spectacle frame and the center of the width of a lower rim located at an outer peripheral lowermost end of the spectacle frame corresponds to the frame cornea vertex distance. In this case, a distance between vertices of the frame is measured based on a bevel position of each spectacle lens, or a bevel position provided on the spectacle frame for mounting the spectacle lens, which facilitates the calculation of a CVD (cornea vertex distance) which is described later.

Note that when the spectacle frame is rimless, a distance to an intersection between the horizontal line and a straight line connecting a midpoint of the width of the rim at a top end of a dummy lens mounted in the frame and a midpoint of the width of the rim at a lower end thereof corresponds to the frame cornea vertex distance.

Further, when the spectacle frame a nylon-thread semi-rimless frame, a distance to an intersection between the horizontal line and a straight line connecting the center of the width of a rim bar, or the center of the width of a brow bar, and the midpoint of the width of the rim at the lower end of the dummy lens corresponds to the frame cornea vertex distance.

To summarize the above cases, the above-mentioned "frame cornea vertex distance" is "a distance between a corneal vertex of a subject and each of spectacles". Note that the term "spectacles" in this embodiment refers to sample spectacles including a spectacle frame in a state where no spectacle lenses are mounted in the spectacle frame, or sample spectacles having dummy lenses mounted in the spectacle frame. The term "dummy lens" described herein refers to a lens other than spectacle lenses to be finally obtained, and refers to, for example, a lens having no power corresponding to a prescription.

Incidentally, in the case of using a rimless spectacle frame, an appearance contour of dummy lenses can be used. Also in this case, the dummy lenses are held by the rimless spectacle frame. In addition, when the subject is viewed from a side surface thereof, in practice, the location where the spectacle lenses are held by the rimless spectacle frame is present at substantially a horizontal position as viewed from the cornea of the subject in most cases. Accordingly, the term "frame cornea vertex distance" is herein used, regardless of the shape of the spectacle frame.

Hereinafter, for convenience of explanation, a case where the spectacle frame is neither a rimless frame nor a nylon-thread semi-rimless frame will be described below. In a case where the spectacle frame is a rimless frame or a nylon-thread semi-rimless frame, an upper most end or a lowermost end of the spectacle frame can read an uppermost end or a lowermost end of the spectacle frame and/or the dummy lens.

A tester sets a straight line which virtually indicates the shape of the spectacle frame as viewed from a side surface thereof, thereby facilitating the measurement of the frame cornea vertex distance. This will be described later in <3. Frame cornea vertex distance measurement method>.

1-B) Outline of a Frame Cornea Vertex Distance Measurement System

Figure 1B:
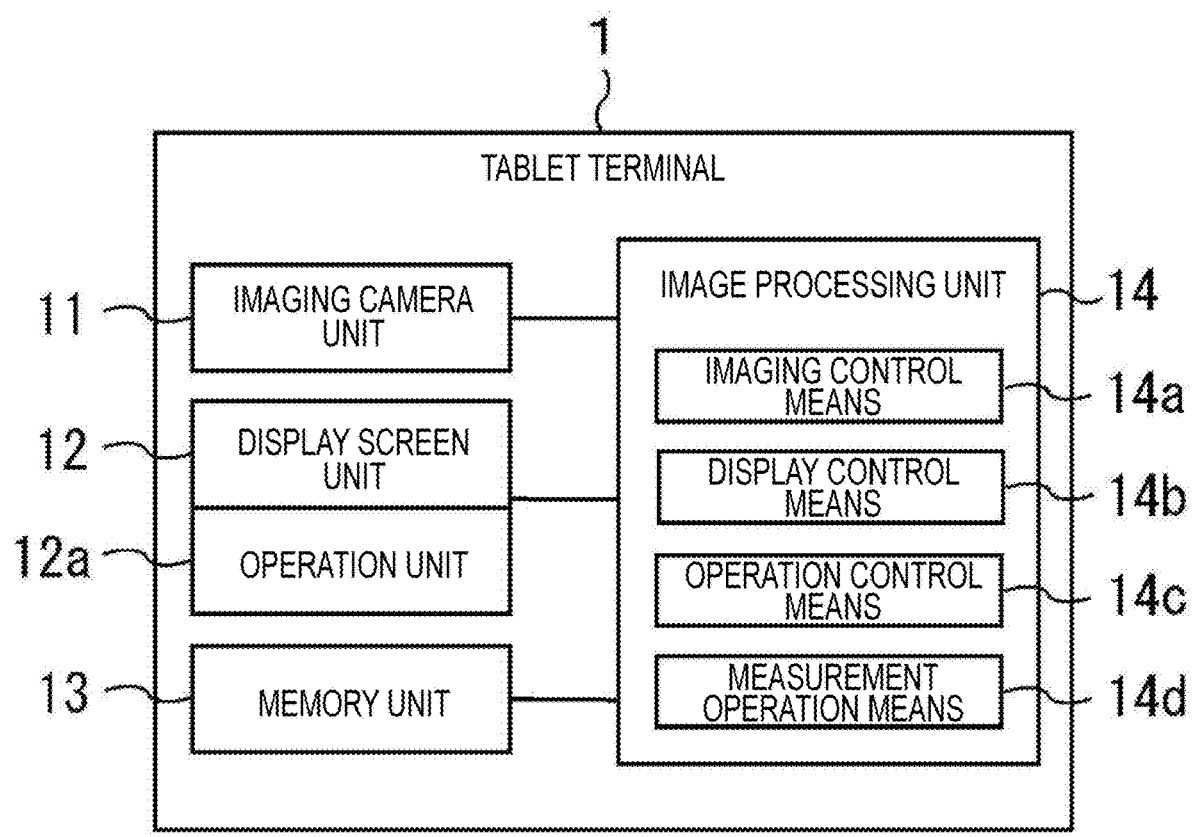

A basic structure of a frame cornea vertex distance measurement system 1 (hereinafter also referred to simply as a "measurement system 1") according to this embodiment will be described with reference to FIGS. 1A and 1B. FIGS. 1A and 1B are explanatory views illustrating the measurement system 1 according to this embodiment. FIG. 1A illustrates an appearance perspective view, and FIG. 1B illustrates a functional block diagram.

The measurement system 1 according to this embodiment mainly includes the following components.

Imaging camera unit 11

Display screen unit 12 functioning as an imaging finder and a touch interface which are capable of freely displaying, as an image, an imaging result of imaging a subject wearing an actual spectacle frame F (hereinafter the reference symbol is omitted)

Information processing unit 14 that uses the imaging result to obtain the frame corner vertex distance between the corneal vertex of the subject and the spectacle frame With the structure described above, the general-purpose imaging camera unit 11 can carry out the measurement while reducing the load on the subject, without the need for using a dedicated device. In addition, it is possible to accurately measure the frame cornea vertex distance with ease at a low cost, while reducing a load on the tester.

1-C) Description of Each Component of the Frame Cornea Vertex Distance Measurement System Each component of the measurement system 1 according to this embodiment will be described below with reference to FIGS. 1A and 1B. Note that in the following example, a case where all the following components are included in a tablet terminal will be described.

As illustrated in FIG. 1A, the measurement system 1 described in this embodiment is formed using a portable tablet terminal device. The measurement system 1 according to this embodiment is hereinafter referred to simply as a "tablet terminal 1".

The tablet terminal 1 includes a portable device housing (body part) 10 which can be carried by a person who measures the frame cornea vertex distance (i.e., a tester for the subject) with his/her hand. The device housing 10 is provided with an imaging camera unit 11 including a Charge Coupled Device (CCD) sensor or a Complementary Metal-Oxide Semiconductor (CMOS) sensor, a display screen unit 12 including a flat panel display, such as a Liquid Crystal Display (LCD) panel, and an information processing unit (not illustrated in FIG. 1A) including a Central Processing Unit 14 (CPU).

Further, the display screen unit 12 is provided with an operation unit 12a for implementing a touch interface. The touch interface refers to a user interface that can be operated by touching the display of the display screen unit 12. Through such a touch interface, information can be input to the tablet terminal 1 from the operation unit 12a.

The operation of the operation unit 12a by the touch interface can be performed using a touch pen illustrated in the figure. However, an operator may directly operate the operation unit with a finger. Further, the operation unit 12a is not limited to the touch interface, and an information input device, such as a keyboard or a mouse, which is connected to the tablet terminal 1, may be used.

The imaging camera unit 11 according to this embodiment includes a camera which is capable of exercising a function of capturing images of a subject and a spectacle frame and is capable of viewing the subject. As a specific structure, the publicly-known imaging camera unit 11 may be used. However, it is extremely preferable to adopt a structure for obtaining the imaging result as image data so that the information processing unit 14 can accurately calculate the frame cornea vertex distance from the imaging result. In the case of a tablet terminal, a part having a camera function included in the tablet terminal 1 serves as the imaging camera unit 11.

The display screen unit 12 according to this embodiment is a part capable of exercising an imaging finder function of displaying an imaging target in the imaging camera unit 11, and a function of displaying a result of operation performed by the information processing unit 14. As a specific structure, the publicly-known display screen unit 12 day be used, and the display screen unit 12 of the tablet terminal 1 may also be used. In this embodiment, as described above, the display screen unit 12 is provided with the operation unit 12a for implementing the touch interfac.

The information processing unit 14 according to this embodiment has a function of performing calibration for associating a vertical width of an outer periphery of a spectacle frame in a real space recorded in advance with a vertical width of an outer periphery of a spectacle frame displayed in the imaging result obtained by the imaging camera unit 11, and obtaining the frame cornea vertex distance from the imaging result based on the result of the calibration. A technique for performing the calibration will be described later. As a specific structure of the information processing unit 14, a control unit of a publicly-known computer may be used. Since the information processing unit 14 has a function of a so-called control unit, the information processing unit 14 is also referred to as a control unit.

Specifically, the tablet terminal 1 functions as a computer including an imaging function, an image display function, and an information processing function.

As illustrated in FIG. 1B, the tablet terminal 1 is provided with a memory unit 13, which is composed of a non-volatile memory, as well as the imaging camera unit 11 and the display screen unit 12, n the device housing 10. The memory unit 13 stores a predetermined program necessary for the information processing unit 14 to perform processing operation, as well as image data obtained by the imaging camera unit 11 and various data input through the touch panel or the like of the display screen unit 12. The predetermined program is read out from the memory unit 13 and is executed to thereby allow the information processing unit 14 to function as imaging control means 14a, display control means 14b, operation control means 14c, and measurement operation means 14d.

The imaging control means 14a controls the operation of the imaging camera unit 11. The operation control for the imaging camera unit 11 includes an operation timing control of a shutter in the imaging camera unit 11. Specifically, the imaging camera unit 11 sets a side surface of the face (and, preferably, a front surface of the face) of the subject wearing the spectacle frame as an imaging target in the case of measuring the frame cornea vertex distance. Then, the imaging control means 14a obtains an imaging result including the face side surface or the face front surface of the subject and the spectacle frame worn by the subject.

The display control means 14b controls the operation of the display screen unit 12. The operation control for the display screen unit 12 includes a control for an image content to be displayed on the display screen unit 12. Specifically, the display control means 14b causes the display screen unit 12 to display the face image of the subject as the imaging target by the imaging camera unit 11, thereby causing the display screen unit 12 to function as the imaging finder of the imaging camera unit 11. Further, the display control means 14b causes various predetermined images to be displayed in the display screen of the display screen unit 12. As described in detail layer, examples of the predetermined images include a pointer image as an index for specifying the position of a point to be specified by the operation unit 12a, a partial enlargement window image to be displayed by enlarging the point to be specified by the pointer image and its peripheral region, various icon images, and a grid image representing each direction as a reference of the display screen.

The operation control means 14c controls the operation of the operation unit 12a. The operation control for the operation unit 12a includes recognition of the position of the point specified by the operation unit 12a. Specifically, the operation control means 14c causes the operation unit 12a to specify a point on the face image of the subject displayed on the display screen unit 12, and recognizes the position of the measurement reference point necessary for measurement of the frame cornea vertex distance.

Note that the above-described imaging control means 14a, display control means 14b, and operation control means 14c are merely preferable examples. The present invention is not limited to the case where the above-described components are present.

In this embodiment, the measurement operation means 14d has a function of performing calibration for associating the vertical width of the outer periphery of the actual spectacle frame recorded in advance with the vertical width of the outer periphery of the spectacle frame displayed in the imaging result obtained by the imaging camera unit 11, and obtaining the frame cornea vertex distance from the imaging result based on the result of the calibration.

Figure 2A:
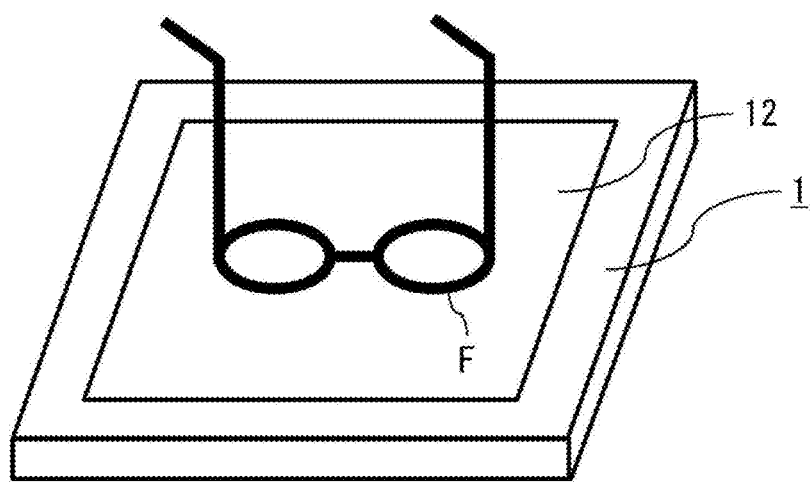
FIGS. 2A to 2C are explanatory views illustrating a state where a width in a vertical direction of a spectacle frame according to this embodiment is obtained by a tablet terminal.
Figure 2B:
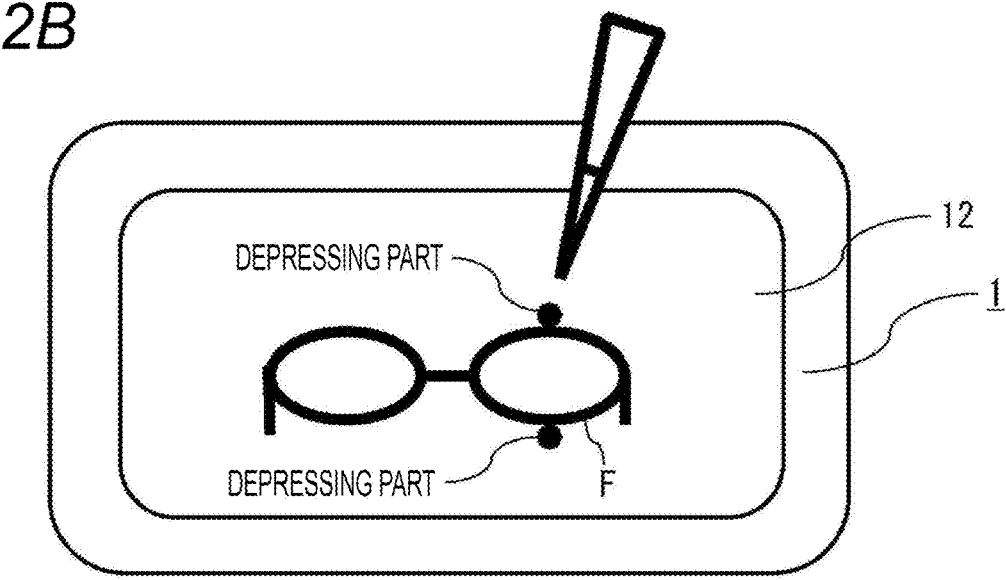
Figure 2C:
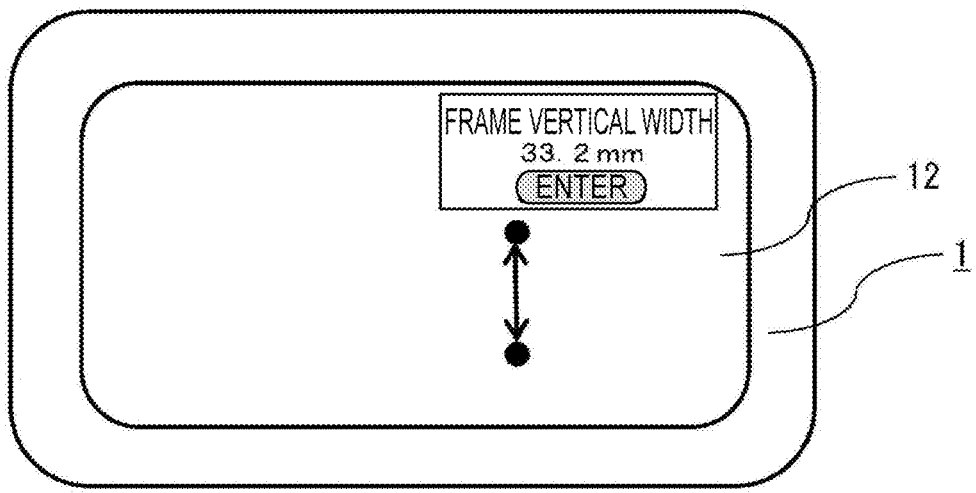

Note that "the vertical width of the outer periphery of the actual spectacle frame recorded in advance" may be obtained by taking the size of the spectacle frame by a ruler or the like prior to the measurement of the frame cornea vertex distance, and the value thus obtained may be stored in the memory unit 13 by the operation unit 12a. However, in this embodiment, the display screen unit 12 has a touch interface function, which makes it possible to take the size of the spectacle frame by using the tablet terminal 1. An example of this case will be described below with reference to FIGS. 2A to 2C. FIGS. 2A to 2C are explanatory views illustrating a state where the width in the vertical direction of the spectacle frame according to this embodiment is obtained by the tablet terminal 1. FIG. 2A is a schematic perspective view illustrating a state where a spectacle frame is placed on the tablet terminal 1 illustrated in FIG. 1A. FIG. 2B is a schematic plan view illustrating a state where the spectacle frame is placed on the tablet terminal 1. FIG. 2C is a schematic plan view illustrating a result of taking the size of the spectacle frame placed on the tablet terminal.

As illustrated in FIG. 2A, the actual spectacle frame worn by the subject is first placed on the display screen unit 12. As illustrated in FIG. 2B, the tester depresses parts of the display screen unit 12 that respectively correspond to an end (top end) in the upper direction of the spectacle frame and an end (lower end) in the lower direction of the spectacle frame. This makes it possible to take the size of the width in the vertical direction (up-and-down direction) of the spectacle frame as illustrated in FIG. 2C.

Note that "the width in the vertical direction of the spectacle frame" indicates a distance between an end (top end) in the upper direction of the outer periphery of a spectacle lens mounting part of the spectacle frame and an end (lower end) in the lower direction thereof. To be more specific, the width indicates a width between an uppermost end and a lowermost end of the rim of the spectacle frame. A part in contact with the spectacle lens in the spectacle frame is herein referred to as an "inner periphery", and a part that faces the part and includes the uppermost end and the lowermost end of the spectacle frame is herein referred to as an "outer periphery". In this embodiment, since the "outer periphery" of the spectacle frame is used as a reference, the size of the actual spectacle frame can be taken easily and the position of the spectacle frame can be easily discriminated from the imaging result, which leads to an improvement, in the accuracy of the calibration.

Figure 5A:
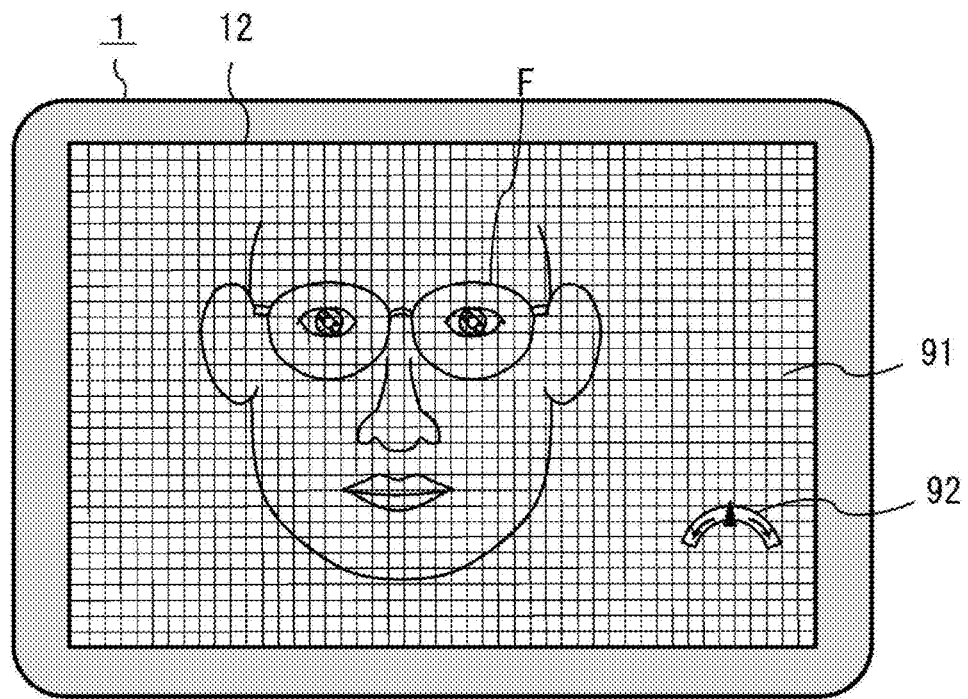
FIGS. 5A and 5B are explanatory views (No. 2) illustrating a specific example of the display content on the display screen unit when the frame cornea vertex distance is obtained in this embodiment.
Figure 5B:
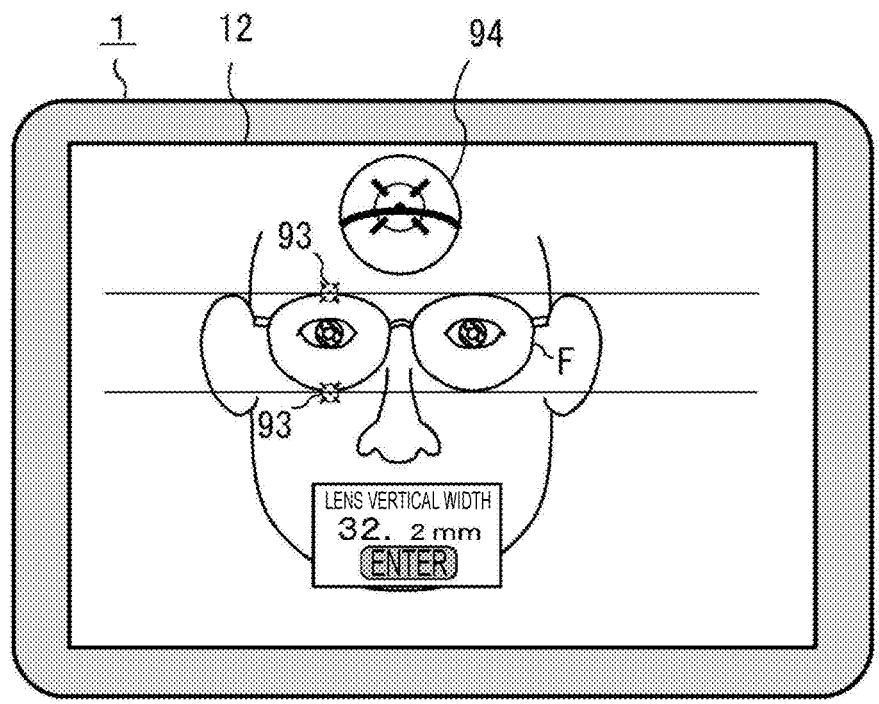

Further, the following techniques may be employed. That is, as illustrated in FIG. 5B, which is described later, two horizontal lines are displayed on the display screen unit 12 by the operation unit 12a in such a manner that the horizontal lines can be operated, and the two horizontal lines are operated so as to come into contact with a top end and a lower end of the outer periphery of the spectacle frame. Thus, it is possible to take the size of the width in the vertical direction of the spectacle frame on the display screen unit 12. In this case, as illustrated is FIG. 5A, which is described later, two horizontal lines may be brought into contact with the outer periphery of the spectacle frame after performing pre-processing of tilting the image from side to side using grid lines. Thus, the accuracy of taking the size of the spectacle frame is improved.

In the case of taking the size of the spectacle frame by the above-described technique, methods other than the method of depressing the parts of the display screen unit 12 that respectively correspond to the top end and the lower end of the outer periphery of the spectacle frame may be employed. For example, in addition to the top end and the lower end of the outer periphery of the spectacle frame, a plurality of points on the display screen unit 12 may be depressed, or the display screen unit 12 may be depressed continuously, along the contour of the outer periphery of the spectacle frame. The target whose size is taken may be a part of the spectacle frame that corresponds to a right eye, or may be a part of the spectacle frame that corresponds to a left eye. Further, processing of taking the size of the both parts and using the average value as the width in the vertical direction of the spectacle frame may be performed. The technique for taking the size of a target may be appropriately set depending on the situation.

The vertical width of the outer periphery of the actual spectacle frame thus obtained is stored in the memory unit 13. On the other hand, the imaging finder function included in the display screen unit 12 is used to display the imaging result obtained by the imaging camera unit 11 on the display screen unit 12. Further, the measurement operation means 14d performs calibration for associating the vertical width of the outer periphery of the actual spectacle frame whose size has been taken with the spectacle frame displayed on the display screen unit 12. Thus, the actual distance can be associated with the image obtained as a result of imaging and the distance within the image is obtained, thereby making it possible to obtain the actual distance.

A predetermined magnification or reduction when the spectacle frame is displayed on the imaging finder may be set to, for example, a reduction scale of 50% of the subject real image. A photographing distance may be set to, for example, 400 mm. These values are merely examples and can be changed as appropriate.

Note that the means 14a to 14d described above are implemented in such a r manner that the information processing unit 14 reads out a predetermined program stored in the memory unit 13 and executes the program. Specifically, the functions as the means 14a to 14d in the tablet terminal 1 are implemented by a predetermined program (i.e., frame cornea vertex distance measurement program according to an embodiment of the present invention) stored in the memory unit 13. In that case, the frame cornea vertex distance measurement program is installed in the memory unit 13 and is used. Prior to the installation, the program may be provided in a storage medium readable by the tablet terminal 1, or may be provided to the tablet terminal 1 through a communication line to be connected to the tablet terminal 1.

This embodiment illustrates an example in which the information processing unit 14 in the device housing 10 functions as the measurement operation means 14d, i.e., an example in which the measurement operation means 14d performs operation processing for obtaining the frame cornea vertex distance in the device housing 10. For example, when the information processing unit 14 is configured to be able to communicate with another device on a communication line wirelessly or through the communication line connected to the tablet terminal 1, the other device may have the function of performing the operation processing for obtaining the frame cornea vertex distance. In other words, the device housing 10 of the tablet terminal 1 may be provided with at least the imaging camera unit 11 and the display screen unit 12, and the functions and the like as the memory unit 13 and the measurement operation means 14d by the information processing unit 14 may be replaced by another device on the communication line, such as so-called cloud computing. Like in the case described above, the technical idea of the present invention can also be applied to a case where another structure is present at a remote location. Accordingly, in the present invention, the structure is referred to as the "frame cornea vertex distance measurement system 1".

A publicly-known component may be added, as needed, to the measurement system 1 in this embodiment.

2. Frame Cornea Vertex Distance Measurement Program

As described above, in this embodiment, a publicly-known component may be used as the imaging camera unit 11. Moreover, a publicly-known tablet terminal may be used. That is, the program for causing the tablet terminal to exercise the functions included in the above-described components also has technical features of the present invention. In this case, the measurement program controls the units described above, and thus controls the tablet terminal 1. Needless to say, the recording medium storing the program also has technical features of the present invention.

3. Frame Cornea Vertex Distance Measurement Method

Next, a procedure for a frame cornea vertex distance measurement method according to this embodiment will be described with reference to FIG. 3. FIG. 3 is a flowchart illustrating the procedure for the frame cornea vertex distance measurement method according to this embodiment.

Note that in this item outline of the procedure for the frame cornea vertex distance measurement method will be described.

The contents of the following steps partially overlap the contents described in <1. Frame cornea vertex distance measurement system>. Accordingly, the description of the contents that are the same as those in <1. Frame cornea vertex distance measurement system>may be omitted. In the following steps, embodiments of the units or members of the measurement system 1 will be described to facilitate understanding of the invention. As a matter of course, the present invention is not limited to the embodiments of the units or means.

The frame cornea vertex distance measurement method according to this embodiment includes the following steps.

Size taking step of taking the size of the vertical width of the actual spectacle frame placed on the display screen unit 12 by the touch interface function included in the display screen unit that displays, as an image, the imaging result obtained by the imaging step Imaging step of imaging a subject (a face side surface or a face front surface) wearing the actual spectacle frame Measurement step of obtaining the frame cornea vertex distance between the corneal vertex of the subject and the spectacle frame by using the imaging result obtained in the imaging step Display step of displaying the frame cornea vertex distance obtained as a result of an operation The steps will be described in detail below.

3-A) Size Taking Step

The size of the actual spectacle frame worn by the subject is taken in advance by the technique described above on the display screen unit 12. In general, the inner periphery of a mounting (or fitting) part of a spectacle lens in a spectacle frame has been conventionally used to take the size of the spectacle frame. On the other hand, in this embodiment, the outer periphery of the spectacle frame is used. This is a technique as well as a structure to be adopted because the size of the actual spectacle frame is accurately taken on the display screen unit 12.

Note that in the size taking step, a method for calculating the vertical width of the outer periphery of the actual spectacle frame whose size is taken as described below is employed. In the calculation, the measurement operation means 14d of the information processing unit 14 may be used.

First, the distance (mm) of the real space per pixel in the display screen unit 12 is recognized in advance. If the display screen unit 12 itself of the tablet terminal 1 includes a publicly-known structure as hardware, the relationship between the number of pixels and the distance (mm) of the real space can be easily defined by, for example, a ratio coefficient K (screen size (mm)/the number of pixels on a diagonal line diagonal line).

After that, as illustrated in FIG. 2A to 2C, the parts of the display screen unit 12 that respectively correspond to the top end and the lower end of the outer periphery of the actual spectacle frame placed on the display screen unit 12 are depressed. The two depressed parts are recognized as coordinates on the display screen unit 12. As a result, the number of pixels present between the two depressed parts can also be recognized. The number of pixels thus recognized is multiplied by the above-mentioned ratio coefficient K, thereby making it possible to take the size of the vertical width of the outer periphery of the spectacle frame in the real space.

As a matter of course, when the vertical width of the outer periphery of the actual spectacle frame is known, the vertical width may be used, without carrying out the size taking step.

3-B) Imaging Step

A person who measures the frame cornea vertex distance e.g., who is a salesperson of a spectacles shop, as well as a tester) picks up images of the face side surface or the face front surface of the subject in a state where the subject wearing the spectacle frame is viewed from the front side thereof. Since the imaging at this time does not require positioning of the face of the subject, it is possible to perform the imaging while letting the subject to take a natural posture by using the imaging camera or the like that can transfer data to a portable terminal device (e.g., a tablet terminal or a smartphone) or computer devices (these are collectively referred to as a computer) having an imaging function and an information processing function, instead of using the CVD measurement device (see Patent Literature 1) like of the related art. Note that the size taking step may be carried out after the imaging step. The imaging step and the size taking step may be carried out prior to the measurement step described later.

3-C) Measurement Step

Based on the imaging result thus obtained, the measurement operation means 14d of the information processing unit 14 in the tablet terminal 1 obtains the frame cornea vertex distance.

At this time, calibration for associating the size in the real space with the size on the picked-up image is required to obtain the frame cornea vertex distance on the picked-up image. The obtained picked-up image includes the image of the spectacle frame. Further, the vertical width of the outer periphery of the spectacle frame (i.e., the vertical width in the real space) is known thanks to size taking in the size taking step. Accordingly, the information processing function of performing processing on the picked-up image makes it possible to perform calibration for associating the size in the real space with the size on the picked-up image by using the spectacle frame and to perform a scale conversion on the picked-up image.

Note that when the width in the vertical direction of the spectacle frame is adopted, the following calibration technique may be employed.

First the width in the vertical direction of the spectacle frame within the image (the width in the vertical direction of the vertical icon image) may be associated with the vertical width of the actual spectacle frame from the image of the side surface of the subject. This technique will be described with reference to FIGS. 4A and 4B. FIGS. 4A and 4B are explanatory views (No. 1) illustrating a specific example of a display content on a display screen unit when the frame cornea vertex distance is obtained in this embodiment.

In accordance with the control by the display control means 14b, as illustrated in FIG. 4A, the face side surface image of the subject as the imaging result obtained by the imaging camera unit 11 in a side surface imaging mode is read out from the memory unit 13 and displayed on the display screen unit 12, and a grid image 81, which is formed in a lattice shape of a predetermined size, as well as the face side surface image, is displayed on the display screen unit 12. This grid image 81 is displayed based on the display screen unit 12 (i.e., along each direction of the long side and the short side of the display screen unit 12) Further, the tablet terminal 1 displays an icon image 82 for adjusting the tilted state of the face side surface image of the subject displayed on the display screen unit 12.

In this state, the tester uses the grid image 81 displayed on the display screen unit 12 to confirm that the face side surface image of the subject, which is also displayed on the display screen unit 12, remains horizontal without being tilted from side to side in the screen. When the image is tilted, the tester operates the icon image 82 on a touch panel or the like to adjust the tilted state of the face side surface image. When the icon image 82 is operated, the display control means 14b performs position correction processing on the face side surface image of the subject displayed on the display screen unit 12 in accordance with the operation content. As a result, the face side surface image of the subject displayed on the display screen unit 12 remains horizontal without being tilted from side to side in the screen.

In the state where the face side surface image of the subject is horizontal in the screen of the display screen unit 12, after that, the tablet terminal 1 performs operation processing for the measurement operation means 14d to obtain the frame cornea vertex distance by using the face side surface image of the subject displayed on the display screen unit 12.

Accordingly, as illustrated in FIG. 4B, the display control means 14b first displays a pointer image 83 having a first graphic pattern and pointer images 84 having a second graphic pattern in such a manner that the images are superimposed on the image of a side surface of the face of the subject so that the tester can specify a measurement reference point for obtaining the frame cornea vertex distance.

Further, the tester operates the operation unit 12a to position the pointer image 83 having the first graphic pattern, which can be moved in the screen of the display screen unit 12, at the corneal vertex on the face side surface image in the display. At this time, the use of the pointer image 83 having the first graphic pattern enables the tester to operate the pointer image 83 to be moved, while viewing the image about the corneal vertex position as the background of the pointer image 83.

Further, the tester operates the operation unit 12a to position the pointer image 84 having the second graphic pattern, which can be moved in the screen of the display screen unit 12, at the top end and the lower end of the rim of the spectacle frame on the face side surface image in the display. At this time, the use of the pointer image 84 having the second graphic pattern allows the tester to operate the pointer image 84 to be moved, while viewing the image of the ends of the rim of the spectacle frame as the background of the pointer image 84.

In this state, when a predetermined operation is performed (e.g., when an "enter" icon image is depressed) by the operation unit 12a, a center point in the pointer image 83 disposed at the corneal vertex position is specified as one of the measurement reference points for obtaining the frame cornea vertex distance, and center points in the pointer image 84 disposed at the top end and the lower end of the rim of the spectacle frame is specified as the remaining measurement reference points for obtaining the frame cornea vertex distance. Note that the above-mentioned two measurement reference points are specified as coordinates.

At this time, when the display control means 14b comes into contact with the pointer mages 83 and 84 to be moved in the screen by the tester, a partial enlargement window image 85 obtained by enlarging and displaying the pointer images 83 and 84 and the peripheral regions is displayed in a predetermined section within the screen of the display screen unit 12. With this structure, even when the pointer images 83 and 84 are operated to be moved by the touch interface, the section in contact with the touch interface is enlarged and displayed in a predetermined section, which is different from the above-mentioned section, by the partial enlargement window image 85. Accordingly, the operability when the tester moves the pointer images 83 and 84 to be positioned is improved.

A segment connected the two measurement reference points thus specified corresponds to a straight line which virtually indicates the shape of the spectacle frame when the side surface is viewed, as described above in 1-A) Frame cornea vertex distance. Calibration for associating the length of the segment with the vertical width of the outer periphery of the actual spectacle frame whose size has been taken in the size taking step is performed. As a result, the size in the real space is associated with the size in the imaging result illustrated in FIG. 4B, the distance in the real space of the frame cornea vertex distance (FVD) in the imaging result is finally obtained.

As another calibration technique, the width in the vertical direction of the spectacle frame within the image (the width in the vertical direction of the vertical icon image) may be associated with the vertical width of the actual spectacle frame from the image of the front surface of the subject. This will be described with reference to FIGS. 5A and 5B. FIGS. 5A and 5B are explanatory views (No. 2) illustrating a specific example of the display content on the display screen unit when the frame cornea vertex distance is obtained in this embodiment.

Note that in FIGS. 5A and 5B, there is a possibility that the spectacle frame may be tilted forward, while the subject is viewing at a distance. However, a degree of a forward tilt (i.e., a forward tilt angle of the spectacle frame) can be obtained from a tilt of a line connecting two measurement reference points on the spectacle frame in a side view as illustrated in FIGS. 4A and 4B. When the information processing unit 14 corrects the vertical width of the outer periphery of the spectacle frame so that the vertical width has a correct value to be displayed in FIGS. 5A and 5B by taking the forward tilt angle is taken into consideration an extremely accurate vertical width of the outer periphery of the spectacle frame can be obtained.

In accordance with the control by the display control means 14b, as illustrated in FIG. 5A, the face front surface image of the subject as the imaging result obtained by the imaging camera unit 11 in a front surface imaging mode is read out from the memory unit 13 and displayed on the display screen unit 12, and a grid image 91, which is formed in a lattice shape of a predetermined size, as well as the face front surface image, is displayed on the display screen unit 12. Processing to be performed in this case is similar to that illustrated in FIG. 4A. The grid image 91 is similar to that denoted by reference numeral 81 in FIGS. 4A and 48, and the icon image 92 is also similar to that denoted by reference numeral 82 in FIGS. 4A and 4B.

Next, in FIG. 5B, like in FIG. 4B, the operation processing in which the measurement operation means 14d obtains the vertical width of the outer periphery of the spectacle frame is performed by using the face front surface image of the subject displayed on the display screen unit 12. Pointer images 93 are similar to those denoted by reference numeral 84 in FIGS. 4A and 4B, and the partial enlargement window image 94 is similar to that denoted by reference numeral 85 in FIGS. 4A and 48.

Thus, the tester moves the pointer image 93 to each position to specify the measurement reference point for obtaining the vertical width of the outer periphery of the spectacle frame, the measurement operation means 14d obtains, as the vertical width of the outer periphery of the spectacle frame, a distance in the vertical direction between the center points of the pointer images 93 at the top end and the lower end of the rim of the spectacle frame.

Figure 10:
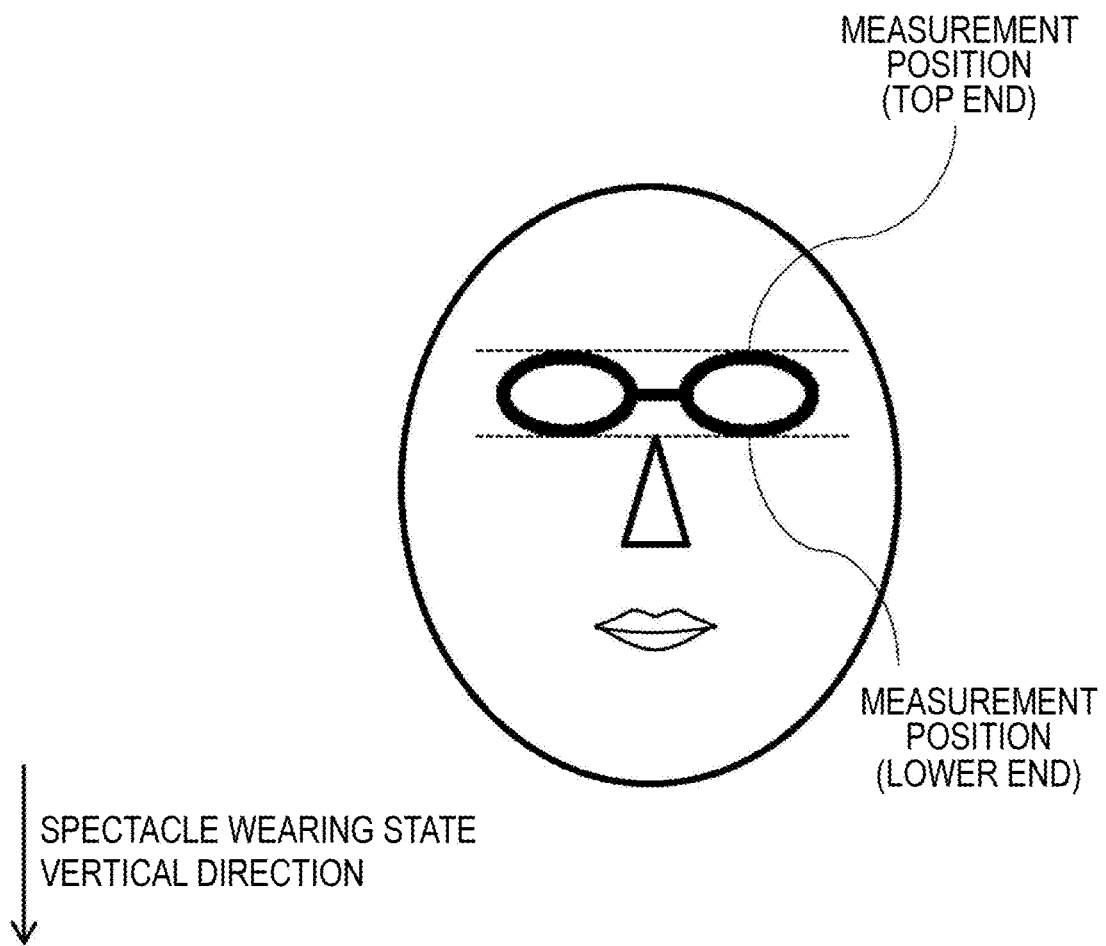
FIG. 10 is a schematic front view of a position where the vertical end width of spectacles is measured.

As described above, as illustrated in FIG. 5B, when two horizontal lines are disposed so as to be in contact with the top end and the lower end of the outer periphery of the spectacle frame, the size taking accuracy is improved. The state is also illustrated in FIG. 10. FIG. 10 is a schematic front view of a position where the vertical end width of spectacles is measured.

Thus, the vertical width of the outer periphery of the spectacle frame obtained by the measurement operation means 14d is displayed in the partial enlargement window image 85 in the screen of the display screen unit 12 in accordance with the control by the display control means 14b. If there is no problem as a result of confirmation by the tester, the operation processing result is stored as data in the memory unit 13.

The above-described contents are related to the calibration for associating the vertical width of the outer periphery of the actual spectacle frame with the vertical width of the outer periphery of the spectacle frame in the imaging result by using the imaging result on the face front surface. After that, as described above, the frame cornea vertex distance is obtained using the imaging result on the face side surface. How to utilize the frame cornea vertex distance in the design for the spectacle lens will be described below.

First, there is a technique for calculating the CVD from the frame cornea vertex distance. FIG. 6 specifically illustrates the state. The CVD illustrated in FIG. 6 is divided into a "frame cornea vertex distance (FVD)" and a "horizontal distance (FLD) from a line connecting measurement reference points, which is obtained by extending a line in the horizontal direction to the spectacle frame worn by the subject in that state from the corneal vertex of the subject, to a contact point on the lens inside surface of a spectacle lens L (as indicated by a broken line; the reference numeral is hereinafter omitted)". The "frame cornea vertex distance (FVD)" can be calculated by the technique described above. On the other hand, the "horizontal distance (FLD) from an end point on the frame of the frame cornea vertex distance present on a line connecting measurement reference points to a contact point on the lens inside surface of the spectacle lens" can be simulated using, as calculation parameters, a refractive index of a lens base material, a lens convex surface curved shape, a lens concave surface curved shape, a lens thickness, a frame forward tilt angle, a frame camber angle, a lens forward tilt angle, an eye point, a bevel position, and a frame cornea vertex distance (FVD) depending on a prescription power of the subject. As a specific technique, the following technique may be employed. For example, a reference FLD is obtained in advance based on the shape of the spectacle lens having a prescription power of zero (S degree is 0.0 diopter, and C power is 0.0 diopter). After that, the shape of the spectacle lens having a predetermined prescription power is simulated. A technique for calculating an accurate FLD based on the simulated shape may be employed.

Note that the spectacle lenses are fitted into a groove of the spectacle frame at a spectacles shop, so that a bevel V is formed on the side surface of the spectacle lens. However, the position of the bevel V may be set as needed. In this case, there is a possibility that the eyeball-side surface of the spectacle lens relative to the spectacle frame may be disposed so as to approach the subject, or may be disposed so as to be apart from the subject. Preferably, information about the position of the bevel V is obtained from the spectacles shop. However, if the information is not obtained from the spectacles shop, the CVD can be finally calculated accurately as long as the FLD in which a variation in the shape of at least the spectacle lens is taken into consideration can be accurately obtained.

Figure 7:
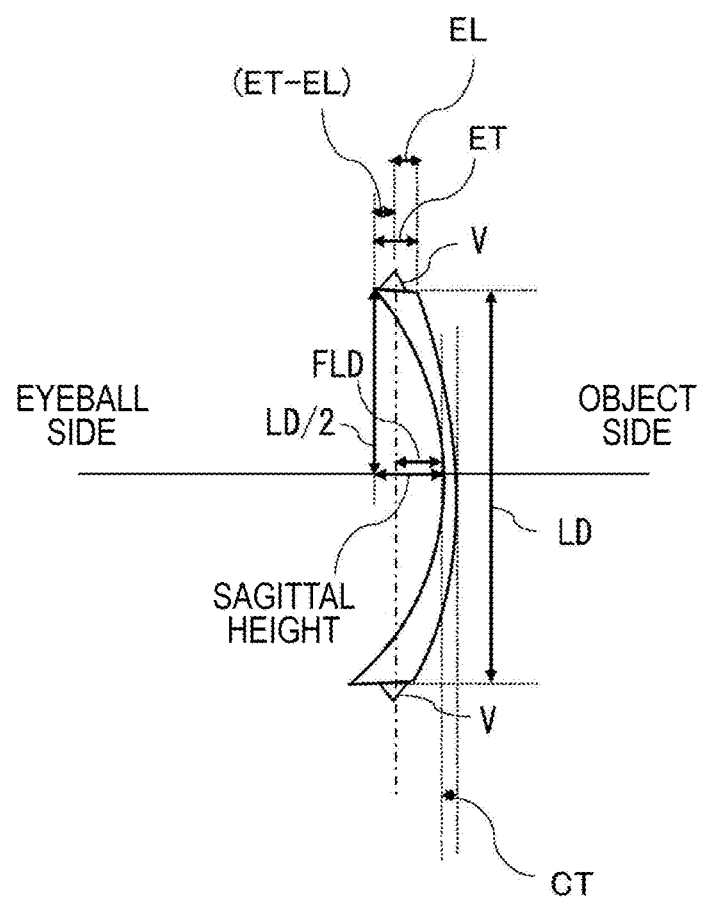
FIG. 7 is a schematic side view of a spectacle lens having a bevel at a lens end face.

Specific examples (Examples) of the CVD calculation method will be described below with reference to FIG. 7 which is a schematic side view of the spectacle lens including a bevel at a lens end face.

Example 1

In this example, prescribed values of the spectacle lens include a refractive index of 1.500, and a power of −6.79 D (diopter).

The shape of the spectacle lens corresponding to the prescribed values is as follows.

Curvature radius R1 of an object-side surface: 1400 mm
Curvature radius R2 of an eyeball-side surface: 70 mm
Central thickness: CT 2.5 mm
End face thickness: (ET) 8.45 mm (this value can be obtained from R1 and CT)
Lens diameter LD at an FLD measurement position: 60 mm
EL (a bevel position on the lens; a distance from the object-side surface of the lens end face to the bevel vertex): 2 mm First, referring to FIG. 7, a sagittal height of an eyeball-side optical surface (also referred to as a height of a lens rear surface; CCsag) is calculated from the above-mentioned R2 and LD. The sagittal height is obtained by the following formula $CCsag = R2 - \{R2^2 - (LD/2)^2\}^{1/2}$. In this example, the sagittal height is 6.754 mm. Thus, the FLD is obtained by FLD=CCsag−(ET−EL) is 6.754−8.45+2=0.304 mm in this example. As a result, the CVL can be obtained as follows.

CVD=FVD (frame inter-vertex distance)+FLD(0.304 mm in this example)=FVD+CCsag−(ET−EL)

The CVD calculation in the example described above can be carried out by specifying reference points at at least the distance between frame vertices and the bevel position. In this case, the bevel may be taken into consideration when the pointer image 84 illustrated in FIG. 4B is positioned. For example, the spectacle frame and/or the bevel position of the spectacle lens may be reflected in the spectacle frame displayed on the display screen unit 12, and the pointer image 84 may be disposed closer to the eyeballs of the subject (or forward) from the midpoint of the horizontal width in the vicinity of the top end of the spectacle frame. Further, the imaging result may be rotated from the state displayed on the display screen unit 12 to locate the spectacle frame in a side view in the vertical direction, and the pointer image 84 may be disposed in the manner as described above.

Another example is a case where a bevel is not set as a reference. In this case, assume that a bevel is present at the center of the lens end face in Example 1. For example, assume that the EL value is ET/2. Accordingly, this embodiment and Example 1 are applied and the CVD can be obtained even when a lens having no bevel (e.g., a rimless frame, or a nylon-thread semi-rimless frame), or even when the bevel position is unclear.

Regardless of the value of the FLD, it is preferable to obtain spectacle wearing parameters necessary to design a spectacle lens based on the frame cornea vertex distance (FVD). The reason for this is as follows. As described above, when the position of the bevel V is set as needed at a spectacles shop, the spectacle lenses may be disposed closer to the person wearing the spectacles than the spectacle frame, or may be disposed closer to a front object. In this case, the position of the vertex on the inner surface of the spectacle lens is varied by a setting at a spectacles shop. In particular, in the case of a minus lens having a large rim thickness, the variation is remarkable. On the other hand, in the case of the frame cornea vertex distance (FVD) using a spectacle frame, the shape of the spectacle frame is fixed regardless of a prescription power or the like of the person wearing the spectacle frame, so that factors for such a variation are eliminated. As a result, the spectacle wearing parameters can be accurately obtained based on the frame cornea vertex distance (FVD). In that case, parameters converted based on the frame cornea vertex distance are prepared again, and the converted parameters may be used to design the spectacle lens.

Note that the above-described contents alone can be considered an invention. As described in <1. Frame cornea vertex distance measurement system>, a problem to be solved by the invention is that from the conventional standpoint, it is extremely important for spectacle lenses to obtain the CVD and it is necessary to accurately measure the CVD, while it is difficult to accurately measure the CVD.

The above contents are defined as structures as described below.

(Structure 1)

A spectacle wearing parameter measurement system including an information processing unit that measures a spectacle wearing parameter based on a distance between a corneal vertex of a subject and each of spectacles worn by the subject.

(Structure 2)

The spectacle wearing parameter measurement system (frame cornea vertex distance measurement system) in which the spectacle wearing parameter includes a cornea vertex distance.

(Structure 3)

The spectacle wearing parameter measurement system further including:

an imaging camera unit; and a display screen unit that displays an imaging result of imaging a subject wearing an actual spectacles as an imaging target.

(Structure 4)

The spectacle wearing parameter measurement system in which the information processing unit measures a spectacle wearing parameter based on a distance between a corneal vertex of a subject obtained from the imaging result and each of spectacles.

(Structure 5)

The spectacle wearing parameter measurement system in which the information processing unit obtains the cornea vertex distance (specifically, as a total value) from a horizontal distance between the cornea vertex of the subject obtained from the imaging result and each of spectacles and a horizontal distance between the spectacles and a contact point on an inner surface of a spectacle lens when a line is extended in the horizontal direction from the corneal vertex of the subject to the spectacles worn by the subject.

(Structure 6)

A spectacle wearing parameter measurement program for causing a computer to function as an information processing unit that measures a spectacle wearing parameter based on a distance between a corneal vertex of a subject and each of spectacles worn by the subject.

(Structure 7)

A spectacle wearing parameter measurement method that measures a spectacle wearing parameter based on a distance between a corneal vertex of a subject and each of spectacles worn by the subject.

(Structure 8)

A spectacle lens manufacturing method that manufactures a spectacle lens by using a spectacle wearing parameter measured based on a distance between a corneal vertex of a subject and each of spectacles worn by the subject.

(Structure 9)

The spectacle wearing parameter measurement system in which the information processing unit measures the spectacle wearing parameter based on a bevel position of the spectacle frame and/or the spectacle lens, in addition to the distance between the corneal vertex of the subject obtained from the imaging result and each of the spectacles.

With the structures as described above, the problem to be solved can be solved and the following advantageous effects can be obtained. Note that the following advantageous effects are also applicable as the advantageous effects of this embodiment.

First, the spectacle frame is not transparent, unlike the spectacle lens. Accordingly, it is easier and more accurate to specify the position of the spectacle frame than to specify the position of the vertex of the inner surface of the spectacle lens. In addition, the effect of a variation or the like of the shape of the spectacle lens or the bevel position can be eliminated. Accordingly, the accuracy of the spectacle wearing parameter to be finally measured can be improved.

Another advantageous effect associated with another structure is that the distance between the corneal vertex and the spectacle frame is a fixed value regardless of a prescription power. Further, the distance from the spectacle frame to the vertex of the inner surface of the spectacle lens is a value of a variable. In other words, if the fixed value can be accurately measured, the accuracy of the cornea vertex distance can be improved even when a value of a variable is present. In addition, if a value of a variable can be calculated by simulating the spectacle lens shape by taking the prescription power or the like into consideration as described above, an extremely accurate cornea vertex distance can be measured. Other spectacle wearing parameters can also be measured based on the cornea vertex distance.

Note that the structures illustrated in this embodiment and preferred examples may be combined as needed with the above-described structure.

3-D Display Step

The value of the frame cornea vertex distance obtained in the measurement step is displayed on the display screen unit 12 of the tablet terminal 1.

As described above, the frame cornea vertex distance and be measured. After that, the spectacle lens can be manufactured using the frame cornea vertex distance. Note that a publicly-known technique may be used as the manufacturing technique.

4. Advantageous Effects of Embodiments

According to this embodiment, the following advantageous effects can be obtained.

First, in this embodiment, unlike in the technique disclosed in Patent Literature 1, a large-scale device is not required. Specifically, when spectacles including the spectacle frame actually worn by the subject are used, it is sufficient to pick up an image of the subject wearing the spectacles. Accordingly, the frame cornea vertex distance can be obtained with a relatively simple structure and at a low cost. Thus, the frame cornea vertex distance can be obtained at many spectacles shops, and the performance of the spectacle lens necessary when the subject wears spectacles can be derived.

In addition to the above-mentioned advantages, the following advantageous effects can also be obtained.

No scale aids are mounted in the spectacle frame, and thus the possibility that a scar may be formed on the spectacle frame can be eliminated. Accordingly, the subject makes sure to finally purchase the spectacles including spectacle lenses fitted into an intact spectacle frame.

Since no scale aids are mounted in the spectacle frame, the possibility that the scale aids may contact the skin of the subject can be eliminated. As a result, the possibility that the subject may have a feeling of discomfort can be eliminated. Further, the possibility that the scale aids may contact the skin of the subject can be eliminated, and the subject is not made nervous. A further another advantageous effect is that since the scale aids are used in a non-contact manner, there is no possibility that health problem may occur. As a result, there is no need for cleaning the scale aids every time a measurement is performed, which leads to a remarkable reduction in load on spectacles shops.

The need for preparing scale aids exclusively used for measurement of the CVD is eliminated. Accordingly, if the scale aids are damaged, a situation where the CVD cannot be measured at spectacles shops cannot occur. As a result, the advantageous effects 1 and 2 described, above can be obtained without any disadvantage.

Since no scale aids are mounted in the spectacle frame, the spectacle frame is prevented from slipping down due to the weight of the scale aids themselves. As a result, the spectacle wearing state can be reproduced as faithfully as possible, and thus the frame cornea vertex distance can be accurately obtained.

When the distance between the cornea of the subject and each of the spectacles by using a known length, the spectacles are used as an index, instead of using an index on a temple as a reference as disclosed in Patent Literature 4 and the index is disposed at a location where the distance to a measurement target (e.g., a corneal vertex) is small (close). Therefore, an error in the measurement value (e.g., FLD, CVD) can be reduced.

In addition to the advantageous effects described above, in this embodiment, advantageous effects due to the reconstruction of the spectacle lens preparation technique of the related art can be obtained. In other words, a technique and a structure for preparing spectacle lenses based on a frame cornea vertex distance are adopted.

By adopting this structure, even when the shape of the spectacle lens greatly varies depending on a prescription power, the measurement reference point of the vertical width of the outer periphery of spectacles is finally given to the outer periphery of the spectacles, there is no hindrance to the calculation of an accurate frame cornea vertex distance.

According to this embodiment, each of the steps described above can be carried out using only the tablet terminal 1. In particular, the size taking step can also be carried out using the tablet terminal 1. The vertical width of the outer periphery actual spectacles may be obtained separately. However, size taking, imaging, calibration, and measurement are carried out by a common platform of the tablet terminal 1 (to be more specific, the display screen unit 12) by adopting the structure and technique of this embodiment. By adopting the common platform, there is no need to convert the size taking result into a form compatible with the imaging result obtained in the imaging step. That is, since each step is carried out using one tablet terminal 1 (display screen unit 12), opportunities for particularly converting the results obtained in each step are reduced. A reduction in opportunities for conversion leads to an improvement in the accuracy of the frame cornea vertex distance to be finally obtained and a reduction in time required for calculating the frame cornea vertex distance.

As described above, according to the present invention, a measurement in which a load on the subject is reduced can be performed when the frame cornea vertex distance is measured. Additionally, calibration can be accurately performed on the picked-up image for the measurement with a simple structure and a low cost, while reducing the load on the subject and the load on the tester as much as possible.

5. Modified Examples Etc.

While the embodiments of the present invention have been described above, the disclosed contents show illustrative embodiments of the present invention. In other words, the technical scope of the present invention is not limited to the above-described illustrative embodiments.

Note that the embodiments have been described above by focusing on the case where the frame cornea vertex distance is obtained. On the other hand, the technical idea of the present invention can be applied also when other spectacle wearing parameters are obtained. For example, a pupil distance to be measured as a distance and a fitting point position are best examples of the spectacle wearing parameters. Accordingly, the above-mentioned "frame cornea vertex distance (measurement system)" can read "spectacle wearing parameter (measurement system)".

Figure 8:
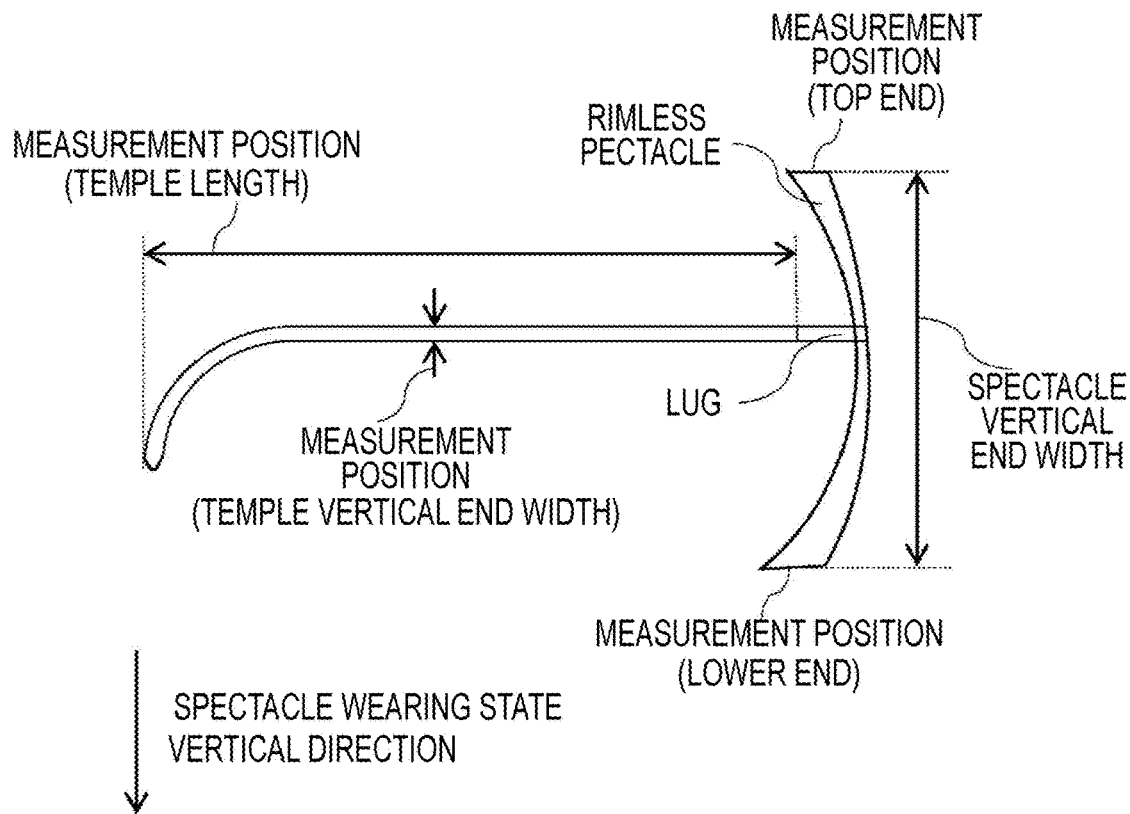
FIG. 8 is a schematic side view of a vertical end width of (rimless) spectacles and a vertical end width of a temple.

In the above embodiments, the association is performed based on the vertical width of the outer periphery of the spectacle frame. However, the association may be performed based on a part other than the vertical width, or based on each part illustrated in FIG. 8 which is a schematic side view illustrating a vertical end width and a temple vertical end width of the (rimless) spectacles.

For example, the size of right and left end pieces (lugs) of the spectacle frame, a distance between hinges, a temple vertical width (thickness), and a rim horizontal width (thickness) may be measured. In that case, for example, the expression "the vertical width of the outer periphery in the spectacle lens mounting part of the spectacle frame" can read "the size of the outer periphery of the spectacle". The phrase "the size of the outer periphery of the spectacle frame" indicates, for example, a part of a structure forming the contour of the spectacle frame, such as the vertical width of the spectacle frame, the width of the temple, the width of the rim. For example, even when the spectacle frame is rimless, the spectacle frame is present in a part where a dummy lens is held. The association may be performed by taking the size of this part and picking up an image of the subject wearing the spectacles (sample spectacles). When the temple width or the rim thickness is set as a reference for measurement, the shape can be relatively easily recognized as compared with other parts of the spectacle frame, and thus the measurement can be facilitated.

In the modified examples described above, the association is performed based on "a part related to the outer periphery of the spectacle frame", but instead may be performed based on other parts. For example, the association may be performed based on the width from the top end of the inner periphery of the spectacle frame to the lower end thereof i.e., "the vertical width of the inner periphery", in a front view of the spectacle frame (in a state where the subject wearing the spectacle frame is viewed from the front side).

However, it should be noted herein that the vertical width of the inner periphery of the contour of a physical appearance of the spectacle frame (hereinafter referred to as an appearance contour) is adopted, instead of the vertical width of the actual inner periphery of the spectacle frame.

The reason why the bevel V is formed in the spectacle lens is that a groove corresponding to the bevel V is formed in the spectacle frame and the spectacle lenses are fitted into the groove. Accordingly, the groove in the spectacle frame needs to be taken into consideration in the vertical width of the actual inner periphery of the spectacle frame, and thus the value of the vertical width of the actual inner periphery of the spectacle frame is larger than the value of the vertical width of the inner periphery of the appearance contour that is a physical appearance of the spectacle frame.

A major feature of the technical idea of the present invention resides in that "the size of spectacles in the real space is linked to the size of spectacles in a virtual space (imaging result) and the value of the spectacle wearing parameter in the real space is obtained from the virtual space (imaging result)". In order to execute this operation correctly and accurately, "the size of spectacles (frame) in the real space" and "the size of spectacles (frame) obtained as an imaging result" need to be reliably recognized.

If the vertical width of the actual inner periphery of the spectacle frame is adopted, the groove in the spectacle frame should be taken into consideration. In this case, if at least "the spectacle frame of the imaging result" is used, the groove in the spectacle frame hidden behind the spectacle lenses or the spectacle frame, which makes it difficult to recognize the position of the groove and to recognize an accurate size.

On the other hand, when the vertical width of the inner periphery of the "appearance contour", which is a physical appearance of spectacles (frame) is adopted, the measurement reference point can be easily specified from the result displayed on the display screen unit 12 for "the size of spectacles of the imaging result", and thus the size of spectacles can be reliably recognized.

Also for "the size of spectacles in the real space", when the spectacle frame is neither a rimless frame nor a nylon-thread semi-rimless frame, the size of a fitting part of the spectacle lens in the spectacle frame may be taken from the front surface by using a caliper or the like, which eliminates the need for taking into consideration the groove in the spectacle frame. When the spectacle frame is a rimless frame or a nylon-thread semi-rimless frame, the size of spectacles themselves may be taken after dummy lenses are mounted in the frame.

In the case of taking the size of the spectacle frame on the display screen unit 12, the spectacle frame into which spectacle lenses are not fitted may be placed on the display screen unit 12 and the measurement reference point may be specified by depressing parts of the display screen unit 12 that respectively correspond to the top end and the lower end of the inner periphery of the spectacle lens mounting part in the spectacles frame. Thus, "the size of the spectacle frame in the real space" can be reliably recognized.

Accordingly, the "appearance contour" in the above examples indicates a contour which does not include a groove formed in the spectacle frame. For example, the appearance contour indicates the contour of the spectacle frame which can be viewed when the tester views a state where, for example, the subject wears the spectacle frame (i.e., spectacles) into which the spectacle lenses are fitted. As another expression, the appearance contour indicates the contour of the spectacle frame which can be viewed in a front view or a side view.

Note that in the examples described above, the vertical width of the inner periphery of the appearance contour is adopted, but instead the size of other parts may be taken. For example, in the appearance contour of the spectacle frame, the "horizontal width" of the inner periphery of the mounting part of the spectacle lenses may be adopted.

Figure 9:
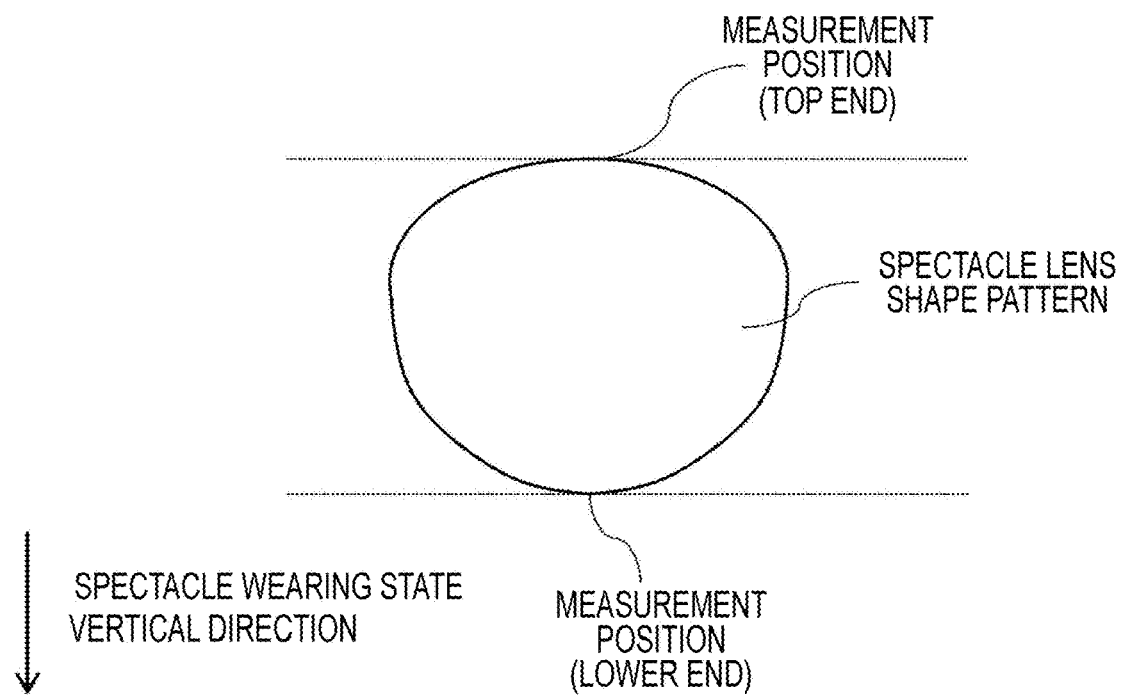
FIG. 9 is a schematic front view of a vertical end measurement position with respect to a lens shape pattern of spectacles.

Further, "the size of the appearance contour of spectacles" is not limited to the appearance contour of the entire spectacles. For example, a part of the spectacle frame and the like as illustrated above (e.g., in the case of a rimless spectacle frame, the appearance contour of a part of a dummy lens, the appearance contour of a part of a spectacle frame that holds lenses, or at least a part of an appearance (contour)) may be adopted and measured. When a rimless spectacle frame is adopted, illustrated in FIG. 9, which is a schematic front view of a vertical end measurement position for a lens shape pattern oaf spectacles, the top end and the lower end of the dummy lens are set as measurement positions in the vertical direction of the spectacle wearing state.

As the appearance to be measured, for example, a vertical width of a temple, a temple length, a horizontal width (thickness) of a rim, a design for spectacles (including a frame), numbers, text, symbols, patterns, and the like can be suitably adopted as the size of the appearance. Note that when the temple length is adopted, the length is relatively large, and thus an accurate measurement value can be obtained.

As described above, a major feature of the technical idea of the present invention resides in that the size of the appearance contour of spectacles in the real space is linked to the size of the appearance contour of spectacles in a virtual space (imaging result). Accordingly, even in a case where the imaging camera unit 11 and the display screen unit 12 are present at different locations, if the imaging camera unit 11 and the display screen unit 12 are connected to the information processing unit 14 via a network or the like; an imaging result is prepared in advance; or an automatic discrimination function for the spectacle frame or the like with respect to the imaging result is provided, the advantageous effects of the present invention can be obtained even when the information processing unit 14 is disposed alone.

REFERENCE SIGNS LIST

1 Frame cornea vertex distance measurement system (measurement system, tablet terminal)
10 Device housing
11 Imaging camera unit
12 Display screen unit
12a Operation unit
13 Memory unit
14 Information processing unit
14a Imaging control means
14b Display control means
14c Operation control means
14d Measurement operation means
81, 91 Grid image
82, 92 icon image
83, 84, 93 Pointer image
85, 94 Partial enlargement window image

The invention claimed is:

1. A spectacle wearing parameter measurement system comprising a processor configured to serve at least as an information processing unit configured to associate a size of an appearance of at least a part of an actual spectacle frame, the size being obtained by size taking or being known, with a size of an appearance of at least the part of the spectacle frame in an imaging result of imaging a subject wearing the actual spectacle frame as an imaging target, and obtain a spectacle wearing parameter from the imaging result based on the association.

2. The spectacle wearing parameter measurement system according to claim 1, wherein the spectacle frame is in a state where no spectacle lenses are mounted in the spectacle frame, or where dummy lenses are mounted in the spectacle frame.

3. The spectacle wearing parameter measurement system according to claim 2, wherein the information processing unit uses the imaging result to obtain a frame cornea vertex distance as a distance between a corneal vertex of the subject and the spectacle frame.

4. The spectacle wearing parameter measurement system according to claim 3, wherein the size of the appearance is a distance between a top end and a lower end of an outer periphery of a spectacle lens mounting part of the spectacle frame.

5. The spectacle wearing parameter measurement system according to claim 4, further comprising:
    an imaging camera unit; and
    a display screen unit configured to display the imaging result as an image,
    wherein the display screen unit functions as an imaging finder and a touch interface each capable of freely displaying, as an image, the imaging target and the imaging result, and the imaging result is displayed by a function of the imaging finer included in the display screen unit.

6. The spectacle wearing parameter measurement system according to claim 5, wherein the distance in the actual spectacle frame is obtained by taking the size of the actual spectacle frame placed on the display screen unit by a function of the touch interface included in the display screen unit.

7. The spectacle wearing parameter measurement system according to claim 5, wherein the association is calibration.

8. The spectacle wearing parameter measurement system according to claim 7, further comprising an operation unit configured to exercise a function of the touch interface included in the display screen unit and capable of freely specifying measurement reference points at an end in an upper direction of an outer periphery of the spectacle frame and an end in a lower direction of the outer periphery of the spectacle frame at a spectacle lens mounting part of the spectacle frame worn by the subject, in the imaging result of front viewed by the subject displayed on the display screen unit,
    wherein the information processing unit performs the calibration based on a distance between the measurement reference points specified by the operation unit.

9. The spectacle wearing parameter measurement system according to claim 1, wherein the spectacle wearing parameter measurement system is a portable terminal device.

10. A non-transitory computer-readable storage medium storing a program for causing a computer to execute a process, comprising:
    associating a size of an appearance of at least a part of an actual spectacle frame, the size being obtained by size taking or being known, with a size of an appearance of at least the part of the spectacle frame in an imaging result of imaging a subject wearing the actual spectacle frame as an imaging target; and
    obtaining a spectacle wearing parameter from the imaging result based on the association.

11. A spectacle wearing parameter measurement method comprising:
    an imaging step of imaging a subject wearing an actual spectacle frame; and
    a measurement step of associating a size of an appearance of at least a part of the actual spectacle frame, the size being obtained by size taking or being known, with a size of an appearance of at least the part of the spectacle frame in an imaging result, and obtaining a spectacle wearing parameter based on the association.

12. The spectacle wearing parameter measurement method according to claim 11, wherein the size taking includes taking, by a touch interface function included in a display screen unit configured to display, as an image, the imaging result obtained in the imaging step, a size of a distance between a top end and a lower end of an outer periphery of the spectacle frame at a spectacle lens mounting part of the actual spectacle frame placed on the display screen unit.

13. The spectacle wearing parameter measurement method according to claim 11, wherein in the measurement step, calibration is performed as the association based on a distance between measurement reference points by specifying the measurement reference points at an end in an upper direction of an outer periphery of the spectacle frame and an end in a lower direction of the outer periphery of the spectacle frame at the spectacle lens mounting part of the spectacle frame worn by the subject in the imaging result of front viewed by the subject displayed on the display screen unit, by using a touch interface function included in the display screen unit.

14. A manufacturing method of a spectacle lens, comprising:
    an imaging step of imaging a subject wearing an actual spectacle frame;
    a measurement step of associating a size of an appearance of at least a part of the actual spectacle frame, the size being obtained by size taking or being known, with a size of an appearance of at least the part of the spectacle frame in an imaging result, and obtaining a spectacle wearing parameter from the imaging result based on the association; and
    a manufacturing step of manufacturing a spectacle lens based on the spectacle wearing parameter.

15. The spectacle wearing parameter measurement system according to claim 1, wherein the size of the appearance of the at least the part of the actual spectacle frame is an actual measurement of the size in real space.

16. The spectacle wearing parameter measurement method according to claim 11, wherein the size of the appearance of the at least the part of the actual spectacle frame is an actual measurement of the size in real space.

17. The manufacturing method of a spectacle lens according to claim 14, wherein the size of the appearance of the at least the part of the actual spectacle frame is an actual measurement of the size in real space.

18. The spectacle wearing parameter measurement method according to claim 11, wherein no scale aids are mounted in the spectacle frame in the measurement step.

19. The manufacturing method of a spectacle lens according to claim 14, wherein no scale aids are mounted in the spectacle frame in the measurement step.

* * * * *